(12) United States Patent
Anderson

(10) Patent No.: US 9,081,789 B2
(45) Date of Patent: Jul. 14, 2015

(54) SYSTEM FOR PREFETCHING DIGITAL TAGS

(71) Applicant: Tealium Inc., San Diego, CA (US)

(72) Inventor: Michael Anderson, Carlsbad, CA (US)

(73) Assignee: TEALIUM INC., San Diego, CA (US)

( * ) Notice: Subject to any disclaimer, the term of this patent is extended or adjusted under 35 U.S.C. 154(b) by 0 days.

(21) Appl. No.: 14/525,031

(22) Filed: Oct. 27, 2014

(65) Prior Publication Data

US 2015/0120858 A1    Apr. 30, 2015

Related U.S. Application Data

(60) Provisional application No. 61/896,351, filed on Oct. 28, 2013.

(51) Int. Cl.
    *G06F 17/30*      (2006.01)
    *G06F 17/22*      (2006.01)

(52) U.S. Cl.
CPC ...... *G06F 17/30132* (2013.01); *G06F 17/2247* (2013.01); *G06F 17/30902* (2013.01)

(58) Field of Classification Search
CPC ..... H04L 63/00; H04L 67/2804; H04L 41/50; H04L 41/508; H04L 41/5041; H04L 67/02; H04L 67/32; G06F 17/30902; G06F 17/3089; G06F 17/30876; G06F 12/0862; G06F 17/30899
See application file for complete search history.

(56) References Cited

U.S. PATENT DOCUMENTS

| | | | |
|---|---|---|---|
| 6,836,799 B1 | 12/2004 | Philyaw et al. | |
| 7,685,168 B2 | 3/2010 | Koinuma et al. | |
| 7,685,200 B2 | 3/2010 | Gunawardena et al. | |
| 7,805,670 B2 | 9/2010 | Lipton et al. | |
| 7,823,059 B2 | 10/2010 | Hodgkinson | |
| 7,890,461 B2 | 2/2011 | Oeda et al. | |
| 7,908,336 B2 * | 3/2011 | Carlson et al. | 709/213 |
| 7,992,135 B1 | 8/2011 | Wong et al. | |
| 8,010,890 B2 * | 8/2011 | Gumz et al. | 715/234 |
| 8,131,861 B2 | 3/2012 | Butler et al. | |
| 8,316,188 B2 * | 11/2012 | Kadambi et al. | 711/137 |
| 8,375,319 B2 * | 2/2013 | Decker et al. | 715/772 |
| 8,407,321 B2 | 3/2013 | Mickens et al. | |

(Continued)

FOREIGN PATENT DOCUMENTS

| | | |
|---|---|---|
| CN | 102693501 A | 9/2012 |
| WO | WO 2009/009109 | 1/2009 |

(Continued)

OTHER PUBLICATIONS

U.S. Appl. No. 14/149,717, filed Jan. 1, 2014, Glommen, et al.

(Continued)

*Primary Examiner* — Ramy M Osman
(74) *Attorney, Agent, or Firm* — Knobbe, Martens, Olson & Bear LLP

(57) ABSTRACT

Systems and methods described herein can take advantage of the caching abilities of the browser and the idle time of the user to prefetch tag libraries of one or more tags for execution in a subsequent content page. For example, these systems and methods can provide the ability to prefetch and not execute a tag library on a content page before it is required so the tag library is cached in the browser. When the browser hits the page that uses the tag library, the tag library can be quickly retrieved from memory and executed.

25 Claims, 13 Drawing Sheets

(56) References Cited

U.S. PATENT DOCUMENTS

| | | | |
|---|---|---|---|
| 8,429,243 | B1 | 4/2013 | Wang et al. |
| 8,539,345 | B2 | 9/2013 | Appleyard et al. |
| 8,560,610 | B2 | 10/2013 | Lunt et al. |
| 2001/0042171 | A1* | 11/2001 | Vermeulen .................... 711/118 |
| 2002/0078147 | A1* | 6/2002 | Bouthors et al. ............. 709/203 |
| 2002/0083167 | A1 | 6/2002 | Costigan et al. |
| 2003/0001888 | A1 | 1/2003 | Power |
| 2003/0184452 | A1 | 10/2003 | Goodgoll |
| 2004/0054784 | A1 | 3/2004 | Busch et al. |
| 2004/0083259 | A1 | 4/2004 | Tenembaum |
| 2004/0123044 | A1* | 6/2004 | Franaszek .................... 711/137 |
| 2005/0125290 | A1 | 6/2005 | Beyda et al. |
| 2005/0138143 | A1* | 6/2005 | Thompson ................... 709/218 |
| 2005/0154781 | A1* | 7/2005 | Carlson et al. ................ 709/203 |
| 2005/0165643 | A1 | 7/2005 | Wilson et al. |
| 2006/0031778 | A1 | 2/2006 | Goodwin et al. |
| 2006/0271669 | A1 | 11/2006 | Bouguenon et al. |
| 2007/0250618 | A1 | 10/2007 | Hammond |
| 2008/0046562 | A1 | 2/2008 | Butler |
| 2008/0077561 | A1 | 3/2008 | Yomtobian |
| 2008/0244051 | A1 | 10/2008 | Morris |
| 2009/0006945 | A1 | 1/2009 | Gumz et al. |
| 2009/0248494 | A1 | 10/2009 | Hueter et al. |
| 2009/0293001 | A1 | 11/2009 | Lu et al. |
| 2010/0179967 | A1 | 7/2010 | Zhang et al. |
| 2010/0228850 | A1 | 9/2010 | Fomitchev |
| 2010/0251128 | A1 | 9/2010 | Cordasco |
| 2010/0281008 | A1 | 11/2010 | Braunwarth |
| 2010/0318976 | A1 | 12/2010 | Everly et al. |
| 2011/0015981 | A1 | 1/2011 | Subramanian |
| 2011/0055314 | A1* | 3/2011 | Rosenstein et al. ........... 709/203 |
| 2011/0055710 | A1 | 3/2011 | Kirkby et al. |
| 2011/0082858 | A1 | 4/2011 | Yu et al. |
| 2011/0093461 | A1 | 4/2011 | Mui et al. |
| 2011/0119374 | A1 | 5/2011 | Ruhl et al. |
| 2011/0153422 | A1 | 6/2011 | Cousins |
| 2011/0153796 | A1 | 6/2011 | Branson |
| 2011/0167391 | A1 | 7/2011 | Momeyer et al. |
| 2011/0185016 | A1 | 7/2011 | Kandasamy et al. |
| 2011/0219115 | A1 | 9/2011 | Capel et al. |
| 2011/0246879 | A1 | 10/2011 | White et al. |
| 2011/0282739 | A1 | 11/2011 | Mashinsky et al. |
| 2011/0296322 | A1 | 12/2011 | Dhanjal et al. |
| 2011/0302306 | A1 | 12/2011 | Hanson et al. |
| 2011/0314092 | A1* | 12/2011 | Lunt et al. ..................... 709/203 |
| 2012/0005257 | A1 | 1/2012 | Narayanana et al. |
| 2012/0016836 | A1 | 1/2012 | Fender et al. |
| 2012/0054596 | A1 | 3/2012 | Kroger et al. |
| 2012/0124131 | A1 | 5/2012 | Muret et al. |
| 2012/0154292 | A1 | 6/2012 | Zhao et al. |
| 2012/0169624 | A1 | 7/2012 | Garn et al. |
| 2012/0221411 | A1 | 8/2012 | Graham, Jr. |
| 2013/0073401 | A1 | 3/2013 | Cook |
| 2013/0086484 | A1 | 4/2013 | Antin et al. |
| 2013/0091025 | A1 | 4/2013 | Farahat et al. |
| 2013/0124332 | A1 | 5/2013 | Doughty et al. |
| 2013/0191208 | A1 | 7/2013 | Chourey et al. |
| 2013/0282898 | A1 | 10/2013 | Kalus et al. |
| 2013/0290480 | A1 | 10/2013 | Manion et al. |
| 2013/0332604 | A1 | 12/2013 | Seth et al. |
| 2014/0013203 | A1 | 1/2014 | Rogoveanu |
| 2014/0081981 | A1 | 3/2014 | Morris |
| 2014/0215050 | A1* | 7/2014 | Lu .................................. 709/224 |

FOREIGN PATENT DOCUMENTS

| | | |
|---|---|---|
| WO | WO 2011/128924 | 10/2011 |
| WO | WO 2013/003302 | 1/2013 |

OTHER PUBLICATIONS

U.S. Appl. No. 14/151,700, filed Jan. 9, 2014, Anderson, et al.
U.S. Appl. No. 14/159,062, filed Jan. 20, 2014, Koo, et al.
U.S. Appl. No. 14/216,801, filed Mar. 17, 2014, Glommen.
Access your campaign report in Google Analytics, http://help.campaignmonitor.com/topic.aspx?t=112, retrieved on Feb. 10, 2014, in 5 pages.
Adobe Analytics/Tag management, http://www.adobe.com/in/solutions/digital-analytics/tag-management.html, retrieved on Feb. 10, 2014, in 1 page.
Behnam, Ali, "Taking Your Test Platform to the Next Level", http://tealium.com/blog/digital-marketing/taking-your-test-platform-to-the-next-level/, retrieved Jan. 12, 2014, in 10 pages.
"Boosting Marketing Agility with Enterprise Tag & Data Management", Ensighten, dated Jun. 2013, in 14 pages.
eVisit Analyst 8 Features, http://www.evisitanalyst.com/eva8, retrieved on Feb. 10, 2014, in 6 pages.
Handwrite on mobile, Google, https://support.google.com/websearch/answer/2649515?p=sbw_tips&hl=en&rd=2, retrieved Jan. 12, 2014, in 3 pages.
Improving Testing & Optimization Through Tag Management—Key Factors to Consider When Choosing the Right Tag Management Solution, Tealium, dated Sep. 2013, in 12 pages.
Padolsey, James, "Avoiding DOM Flickering", published: Jul. 23, 2009, pp. 1-6, http://james.padolsey.com/javascript/avoiding-dom-flickering/.
"Site Tagging Best Practices Version 1.0 Draft Public Comment", iab (Interactive Advertising Bureau), dated Nov. 29, 2012, in 18 pages.
"TagMan and Digital Fulcrum Join Forces to Optimize Performance of Legacy 3rd Party Tags", http://www.tagman.com/tagman-and-digital-fulcrum-join-forces-to-optimize-performance-of-legacy-3rd-party-tags/, New York, NY, dated Feb. 9, 2012, in 3 pages.
Website: 'TheScarms', "ASP.net V2.0 Client-Side JavaScript Callbacks (AJAX)", published: Jul. 18, 2007, pp. 1-4, http://web.archive.org/web/20070718054551/http://www.thescarms.com/dotnet/ajax.aspx.
West, "Tag management Systems: How do I choose?" Demystified, Jul. 29, 2013, in 5 pages.
International Search Report and Written Opinion issued in International Application No. PCT/US2014/012217 mailed on May 21, 2014, in 11 pages.
"Preload CSS/JavaScript without execution," http://www.phpied.com/preload-cssjavascript-without-execution, Apr. 21, 2010, in 14 pages.
"What are the ways to load JavaScript or CSS without executing them?" http://stackoverflow.com/questions/8843132/what-are-the-ways-to-load-javascript-or-css-without-executing-them, Jan. 12, 2012, in 4 pages.
"Separating JavaScript Download and Execution," http://www.nczonline.net/blog/2011/02/14/separating-javascript-download-and-execution, Feb. 14, 2014, in 7 pages.
International Search Report and Written Opinion issued in International Application No. PCT/US2014/052774 mailed on Dec. 29, 2014, in 23 pages.
International Search Report and Written Opinion issued in International Application No. PCT/US2014/052766 mailed on Dec. 8, 2014, in 11 pages.
International Search Report and Written Opinion issued in International Application No. PCT/US2014/063927 mailed on Jan. 29, 2015, in 11 pages.

* cited by examiner

SYSTEM FOR PREFETCHING DIGITAL TAGS

RELATED APPLICATIONS

This application claims priority under 35 U.S.C. §119(e) as a nonprovisional application of the following U.S. Provisional Application:

| App. No. | Filing Date | Title |
|---|---|---|
| 61/896351 | Oct. 28, 2013 | SYSTEM FOR PREFETCHING DIGITAL MARKETING TAGS |

In addition, this application is related to U.S. application Ser. No. 14/149,717, filed Jan. 7, 2014, titled "Content Site Visitor Processing System" and U.S. application Ser. No. 14/151,700, filed Jan. 9, 2014, titled "Combined Synchronous and Asynchronous Tag Deployment." The disclosures of each of the foregoing applications are hereby incorporated by reference in their entirety. Further, any subset of the embodiments described herein can be implemented in combination with any subset of the embodiments described in the foregoing applications.

BACKGROUND

Some operators of content sites, such as websites, regularly obtain the results of analytics performed with regard to user interactions on their content sites. User analytics can include any type of data regarding interactions of end users with content sites, among other types of data. There are different approaches to gathering analytics data, one of which includes employing the use of digital tags.

Digital tags can include small pieces of website code that allow a website operator to measure traffic and visitor behavior, understand the impact of online advertising and social channels, use remarketing and audience targeting, or use personalization features to test and improve a content site, among optionally other functions. Adding tags to a content site has typically required involving a developer to manually insert tag code into one or more pages of a website.

SUMMARY

In most cases, tag libraries are both loaded and executed in consecutive steps. Once a tag library is loaded in a browser, it may be stored or cached by the browser for a period of time, and if a subsequent request occurs, it may be loaded immediately from memory and may not require reloading over the network. In addition, during a navigation flow on a website (such as checkout, signup, etc.) pages often have significant periods of idle time where content has already loaded and users are interacting with the website, nor is there any sense of urgency to load content relevant to user experience.

An aspect of at least one of the embodiments disclosed herein includes the realization that the caching abilities of many common browsers and the time during which users "idle" on a web page, which varies but is frequent, can be used to prefetch tag libraries of one or more tags for execution in a subsequent content page. Such prefetching can enhance performance of the browser, the user experience, and execution of tags on the subsequent content page. Although there is a chance that the user will not browse to the subsequent content page or otherwise trigger execution of those pre-fetched tags or tag libraries, the user experience is not necessarily drastically affected in a negative way because the prefetching can be performed during user idle time.

For example, in some embodiments described herein, tags or tag libraries can be prefetched but not executed on a page before they are required so the tags or tag libraries are cached in the browser. When the browser hits the page that uses the tags or tag library or otherwise triggers those pretetched tags, they can be quickly retrieved from memory and executed. Such prefetching can thereby reduce the amount of browser resources at the initial moment a user browses to a new content page, which is a time when users typically are focused on waiting for the content to load. Thus, prefetching tags and/or tag libraries can provide a desirable reduction in demand of browser resources and thus improve the browsing experience for the user.

BRIEF DESCRIPTION OF THE DRAWINGS

Throughout the drawings, reference numbers are re-used to indicate correspondence between referenced elements. The drawings are provided to illustrate embodiments of the features described herein and not to limit the scope thereof.

DETAILED DESCRIPTION

I. Tag Management Overview

Figure 1:
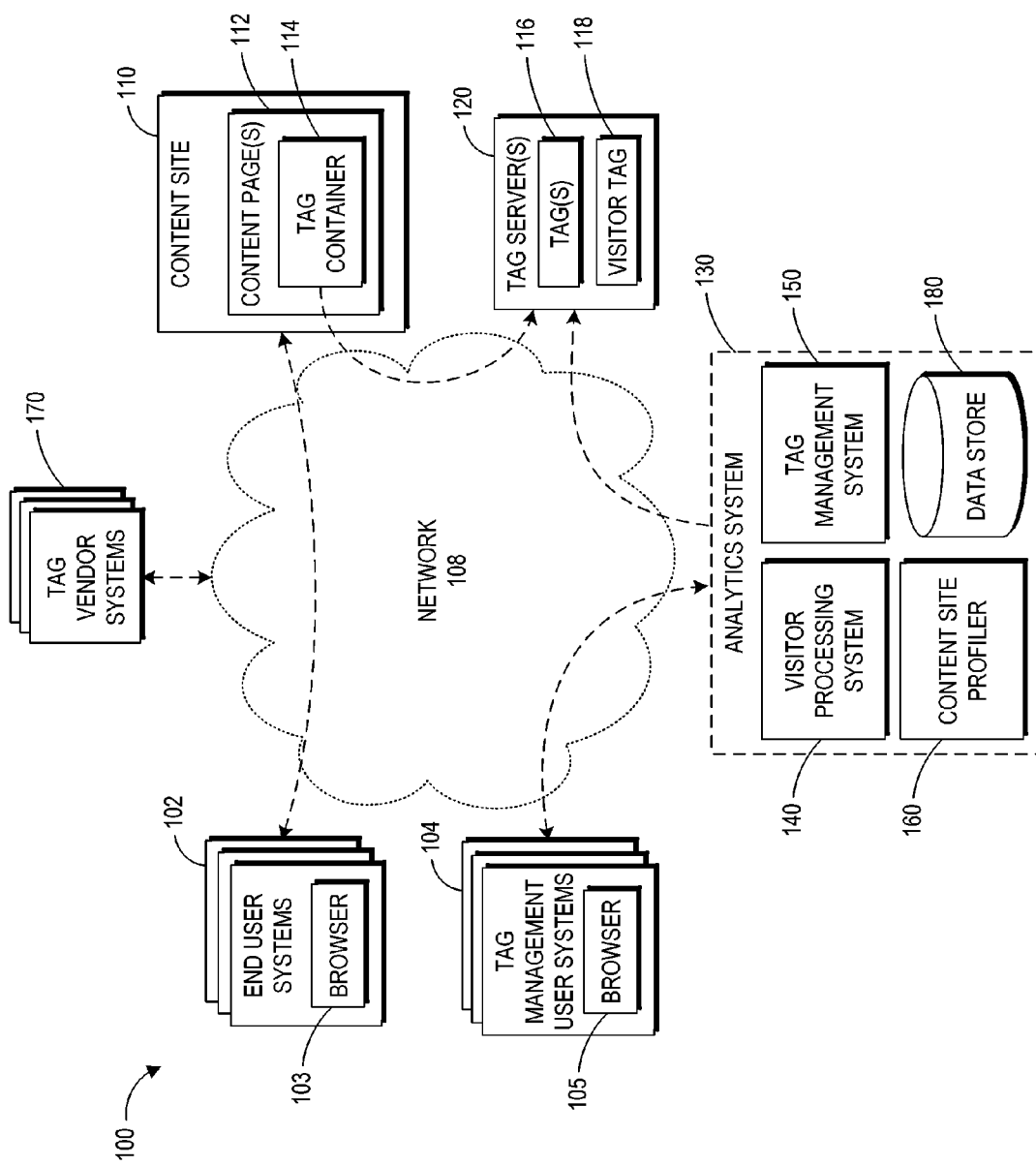
FIG. 1 depicts an embodiment of a computing environment that provides access to an analytics system including a visitor processing system and/or a tag management system.

Adding tags to web pages without efficient management can create significant problems and inconveniences. For instance, code associated with multiple tags can bog down a content site and can be a major performance drain. Redundant or incorrectly applied tags can also distort measurements and result in duplicate costs or missing data. Poor tag management can also be time consuming for the information technology (IT) department or webmaster team to add new tags, which may mean that important measurement and marketing programs might be significantly delayed.

Tag management systems have recently been introduced to improve the management of tags. In one embodiment, a tag management system can deploy a single tag or a tag container to a content site. Each page or any subset of pages in the content site can incorporate the tag container as a universal tag that can be used to gather any type of visitor data of a visitor to a content site. This tag container can be used to interface with any number of third party vendor tags without requiring, in certain embodiments, such tags to be coded expressly in the code of the content pages (such as web pages) of the content site. Thus, changes to the tagging of a content site may be made through a user interface provided by the tag management system without having to use a developer to add the tags to the content pages manually. As a result, the tag management system can be more accessible to people without IT or programming knowledge.

This tag container approach to tag management can promote high scalability and provide marketing agility, enabling marketers and other tag management users to rapidly change data collected or analyzed by the tag management system. Further, since one tag container is embedded within the content pages in certain embodiments, the content pages may load faster and, therefore, include many performance improvements. Moreover, there may be reduction of IT costs provided by using the disclosed tag management system because IT personnel can shift away from performing tag management work to focusing on IT work. However, as will be seen below, it can be beneficial to include a second tag container to address other performance issues related to personalization for testing and improving a content site.

II. Overview of Tag Prefetching

When a user browses the internet, the demand on the client computer changes drastically from moment to moment. For example, at some points in time, a user's computer can be heavily burdened with two-way communications with content pages, downloading various kinds of media (e.g., text, graphics, images, videos, sounds, etc.), rendering the downloaded media, certificate verifications, etc. Moments later, after all media content requests have been satisfied and the user is simply looking at the screen or has walked away, the user's computer might be largely idle.

One example of heavy use of browser resources is when a user initially requests a new page. Often times, when a user initially requests access to a new page, the user is more highly focused on the computer's responsiveness and the speed at which content is loaded and displayed. For example, the moment immediately following a user request to load a new content page is typically associated with a user staring at a computer display, watching graphics gradually render, and functionalities to gradually be activated. Delays in this process can be frustrating to a user.

Some delays can be generated by web pages that use digital tag management solutions coded to load tag libraries of one or more tags on pages for content, user experience, or data collection functionality. When these tags load, they may be pulled over a network from a web-enabled server or the like and loaded in a content page. This loading takes time and uses some of the available bandwidth of the browser. More specifically, these tags sometimes load at the top or beginning of a web page, and as a result the page may take longer to load and thus can negatively affect the user's experience.

As these tag libraries grow in size, this time duration increases. If there are any delays in the delivery of a tag library, the page load may be further delayed. Studies have shown that delays in page load can negatively impact "site conversion rates," which can directly impact a company's revenue. Current technologies incur this load burden and load tag libraries when they are needed. However, as the number of tag libraries on a page increases, pages take longer to load, and customer experience is diminished. Even if asynchronous tag loading schemes are used, tags may not complete their loading before a user navigates to a different page, resulting in potential loss of analytics information.

In most cases, tag libraries are both loaded and executed in consecutive steps. Once a tag library is loaded in a browser, it may be stored or cached by the browser for a period of time, and if a subsequent request occurs, it may be loaded immediately from memory and may not require reloading over the network. In addition, during a navigation flow on a website (such as checkout, signup, etc.) pages often have significant periods of idle time where content has already loaded and users are interacting with the website, nor is there any sense of urgency to load content relevant to user experience. Embodiments described herein can take advantage of the caching abilities of the browser and the idle time on the page to prefetch tag libraries of one or more tags for execution in one or more subsequent content pages. For example, in certain embodiments, systems and methods described herein can provide the ability to prefetch and not execute a tag library on a page before it is required so the tag library is cached in the browser. When the browser hits the page that uses the tag library, the tag library can be quickly retrieved from memory and executed.

For purposes of summarizing the disclosure, certain aspects, advantages and novel features of several embodiments are described herein. It is to be understood that not necessarily all such advantages can be achieved in accordance with any particular embodiment of the embodiments disclosed herein. Thus, the embodiments disclosed herein can be embodied or carried out in a manner that achieves or optimizes one advantage or group of advantages as taught herein without necessarily achieving other advantages as may be taught or suggested herein.

III. Example Computing Environment for Prefetching Tags

Prior to describing prefetch functionality in detail, a computing environment for fetching tags will be described. Turning to FIG. 1, an embodiment of a computing environment 100 is shown for implementing various tag features, including tag prefetching. In the computing environment 100, one or more end user systems 102 communicate over a network 108 with a content site 110. The end user systems 102 can include any form of computing device and may be desktops, laptops, smartphones, tablets, or the like. A browser 103 or other application software installed in the end user systems 102 accesses one or more content pages 112 of the content site 110. The content pages may be web pages or other documents or files that may be accessed remotely and provided to the end user systems 102. Accordingly, the content pages 312 may be web pages, documents (e.g., .pdf documents), videos, images, text, combinations of the same, or the like. The content site 110 may be a website, a web server, an application server, a database server, combinations of the same, or the like. Further, the network 108 can include a local area network (LAN), a wide area network (WAN), a company intranet, the public Internet, combinations of the same, or the like.

As shown, one or more content pages 112 of the content site 110 can include a tag container 114. The tag container 114 can be an example of the tag container described above and can be a universal tag that is installed or incorporated in one or more content pages 112 in place of, or instead of, incorporating numerous tags in each page. The tag container 114 can communicate with one or more data collection tags 116, 118 (sometimes referred to herein as digital marketing tags or simply digital tags) implemented on one or more tag servers 120. In an embodiment, one of the tags 116 is a master tag that calls other tags 116, 118. The master tag (see FIGS. 4A and 4B) can load and cause tags 116, 118 to be executed, and the master tag can also prefetch tags 116, 118 for later execution in a different page from the content page 112 currently accessed by the browser 103. Both the tag container 114 and the tags 116, 118 can be implemented as scripts or the like using a language such as JavaScript or the like. In some instances, the one or more content pages 112 can be accordingly understood to include data representing the tag container 114 or data representing the tags 116, 118.

Both the content site 110 and the tag servers 120 can be implemented in computer hardware and/or software. The tags 116, 118 can include third party tags 116 provided by tag vendors that are different entities than an operator of, or provider of, the tag container 114. In addition, the tags can include a visitor tag or tags 118 that can be provided by the same provider as the provider of the tag container 114 (or a different provider in some embodiments). In some embodiments, the tag container 114 can be considered a tag, even if the tag container 114 merely calls other tags for execution. In addition, the tag container 114 can also collect data in addition to calling other tags in some embodiments.

An analytics system 130 is shown in communication with the tag servers 120. The analytics system 130 can be implemented in computer hardware and/or software, for example, in one or more physical and/or virtual servers that may be geographically co-located or dispersed. In the depicted embodiment, the analytics system 130 includes a visitor processing system 140, a tag management system 150, a content site profiler 160, and a data store 160.

In certain embodiments, the visitor processing system 140 can enable tag management users (described below) to configure the types of data tracked for different visitors of the content site 110, as well as analyze and report on this visitor data. For instance, in one embodiment, the visitor processing system 140 can provide one or more user interfaces that enable customization of collecting information about visitors to the content site 110. This information can be obtained initially by the visitor tag(s) 118, which may be provided through the tag container 114 to the end user systems 102 for execution in the browser 103. Upon execution in the browser 103, the visitor tag(s) 118 can supply visitor data to the visitor processing system 140 (optionally through the tag servers 120). Such visitor data can be stored in visitor profiles in the visitor profile data repository 160, which may include physical computer storage. Tag management users can subsequently query the visitor profiles to obtain reports or other information about visitors to the content site 110. Visitor data can also be used to enhance tag prefetching, as will be described below with respect to FIG. 6.

The tag management system 150 can be used to manage the tags 116 provided by third party vendors. For instance, the tag management system 150 can provide functionality for tag management users to select which third party vendor tags 116 to associate with the tag container 114 for a variety of vendor-specific processing purposes. These purposes can include obtaining analytics for data analysis or business intelligence, tracking affiliate activity with respect to the content site 110, obtaining user data for displaying targeted ads, obtaining user data for customizing search functionality or email campaigns targeted to the end users, obtaining user data for personalizing content of the content pages 112, obtaining user data for integration with social networking functionality, obtaining user data for big data analysis, combinations of the same, or the like. Data collected by the tags 116 can be provided to tag vendor systems 170, which can perform any of this vendor-specific processing. The data may alternatively be passed to the tag vendor systems 170 through the tag management system 150.

In an embodiment, the tag management system 150 also provides functionality (such as one or more user interfaces) for tag management users to map data sources in the content pages 112 to data sources gathered by the third party vendor tags 116. For instance, if one of the content pages 112 includes a shopping cart value named "cart value," the tag management system can provide a user interface that enables a user to tell the tag management system 150 to collect data on the "cart value" and map this data to a "cart_value" variable of one of the tags 116. In addition, the tag management system 150 can provide similar functionality for identifying which data sources of the content pages 112 are to be gathered by the visitor tag 118.

However, in some embodiments, the visitor tag 118 can instead perform a greedy collection of some or all data available in the content page(s) 112. Since the visitor tag 118, tag container 114, and visitor processing system 140 can be provided by the same entity, the data obtained by the visitor tag 118 need not be mapped to third party mappings like the data obtained by the third party tags 116. Instead, some or all of the data available to the visitor tag 118 can be provided to the visitor processing system 140 for processing. Thus, the visitor tag 118 can facilitate vendor-neutral data gathering of some or all of the data elements in a content page 112. Since this data is not mapped to a vendor-specific format in certain embodiments, the data can be exported to business intelligence systems without a need to massage the data from its mapped form (which can be cumbersome) to its original, raw form. Visitor profile data can also be used to enhance tag prefetching, as will be described in greater detail below with respect to FIG. 6.

Moreover, the tag management system 150 can also provide functionality for adjusting tag prefetch settings. For instance, the tag management system 150 may provide one or more user interfaces that enable tag management users to specify which tags to prefetch or which content pages 112 on which tags should be prefetched. These user interfaces of the tag management system 150 may also provide functionality for users to specify sequences of content pages in which tags should be prefetched. Content page sequences can include two or more content pages that are typically accessed by a user in order. One example sequence of pages might include a product page, a shopping cart add page, a checkout page, and a receipt page. This particular sequence is described in greater detail below with respect to FIGS. 2A and 2B. In addition, examples of user interfaces that may be output by the tag management system 150 are described below with respect to FIGS. 8 and 9.

Even if users do not specify a particular page sequence, it may be possible to programmatically identify one or more page sequences for which prefetching may be performed. The content site profiler 160 can include functionality for programmatically identifying sequences of content pages 112 on the content site 110. The content site profiler 160 may, for example, receive content page 112 access data from the tag container 114 and/or the master tag 116 called by the tag container 114. From this content page 112 access data, the content site profiler 160 can build a profile of the content site 110 represented as a graph data structure or the like that links pages based on their successive accesses by users. The graph can include directional relationships between pages based on users subsequently accessing one page to the next as well as information regarding the number of times users followed those page associations or the like. From this content site profile, the tag management system 150 can programmatically identify which content pages 112 in a detected sequence to prefetch tags for, techniques for which will be described in greater detail below.

The content site profiler 160 can store content site profiles in the data store 180. The data store 180 may also store visitor profiles generated by the visitor processing system 140, tags created or managed using the tag management system 150, and prefetch rules or instructions created using the tag management system 150. The data store 180 may include physical computer storage and may include one or more databases or file systems for storing this information.

Various tag management user systems 104 can access the analytics system 130 and/or the tag servers 120 via the network 108. Like the end user systems 102, the tag management user systems 104 can include a browser 105 or other application software that can access network applications over the network 108. The tag management user systems 104 can also be any type of computing device including, but not limited to, a desktop, laptop, tablet, smartphone, or the like. The tag management user systems 104 can be operated by users such as marketing professionals, website operators, business users, operators of the content site 110, or any other individual who uses tags or data obtained from tags. Tag management users are not the end users of the content site 110 in certain embodiments. A tag management user might use a tag management user system 104 to dynamically update the types of data tracked or analyzed for different visitors of the content site 110. This data can be tracked by the visitor processing system 140 via either updating the visitor tag 116 stored on the tag server 120 or by updating processing of data obtained from the visitor tag 116 to build updated visitor profiles 130, many example features of which will be described in greater detail below. In addition, a tag management user might use a tag management user system 104 to update tag prefetch settings by accessing one or more tag prefetch user interfaces provided by the tag management system 150.

IV. Example Page Loading Scenarios

Figure 2A:
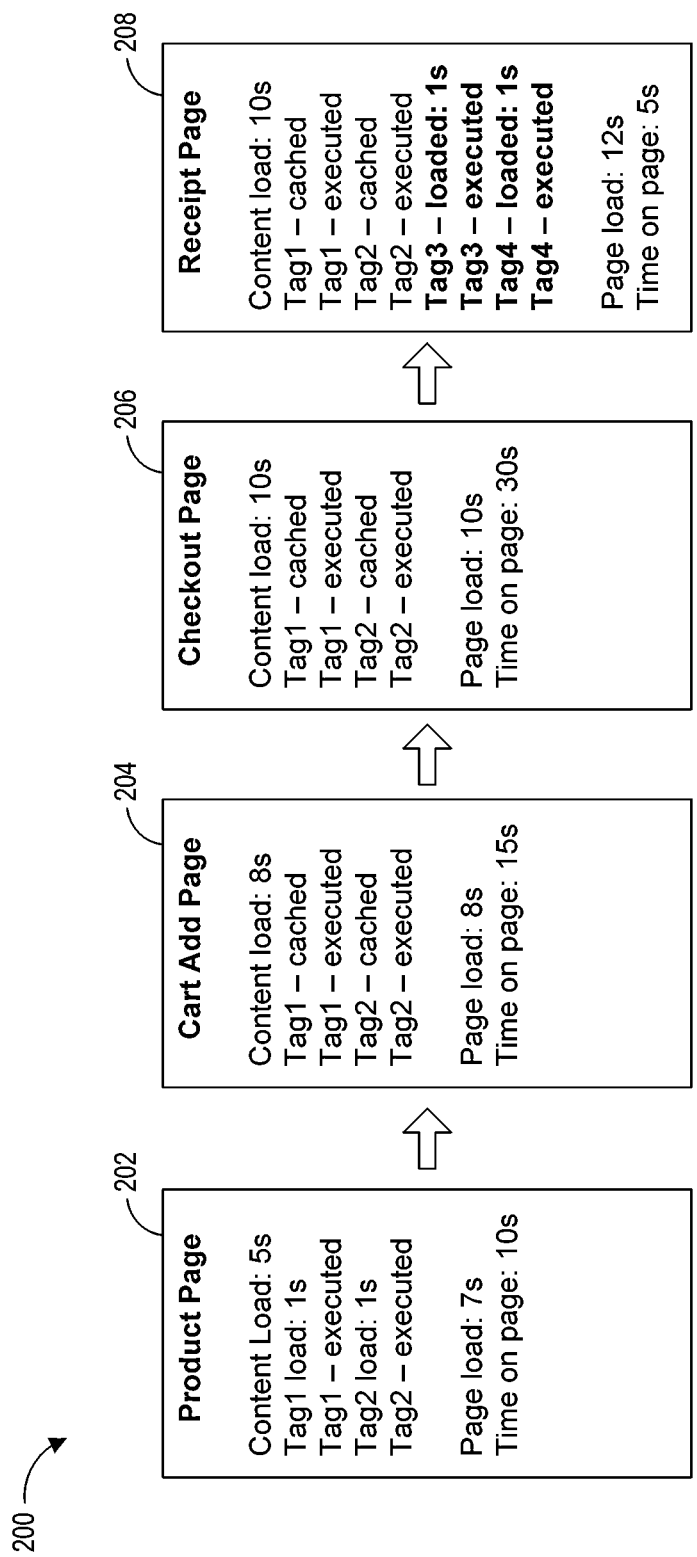
FIGS. 2A, 2B, and 2C depict example tag loading scenarios in which example sequences of pages of a content site are shown.

FIG. 2A depicts an example tag loading scenario in which an example sequence 200 of content site pages is shown. The sequence 200 represents an example checkout flow from an initial product page 202, where a user might browse a product, to a cart add at page 204, where the user may add the product to an electronic shopping cart. Following the cart add page 204 is a checkout page 206, where the user may fill in details such as billing information, shipping information and so on. Following the checkout page 206 is a receipt page 208, where the user may be shown a receipt for his or her purchase of the product.

Each page 202, 204, 206, and 208 is shown with content loading statistics as well as tag loading statistics. The loading times shown are merely examples and may be longer or shorter in other embodiments. For instance, the product page 202 lists a content load time of five seconds and also depicts the loading of two tags, tag 1 and tag 2. Both tags 1 and 2 are executed as well as loaded on the product page 202. As shown, the content load time for the product page 202 is five seconds whereas the tag load times are each one second, resulting in a total page load time of seven seconds. In addition, the time on page is shown as ten seconds. The time on page may represent idle time where the page is not loading new content. During this idle time, the user may be viewing the page, entering text on the page, scrolling the page, watching a video or listening to audio on the page, or the like.

In the cart add page 204, the content loads in eight seconds. Because tags 1 and 2 have already been loaded by the browser in the product page 202, tags 1 and 2 are cached and therefore do not need to be loaded again at the cart add page 204. Thus, tags 1 and 2 are retrieved from memory and executed rapidly, resulting in a page load time approximately equivalent to the content load time of eight seconds. In addition, in this example, the idle time on the page is 15 seconds.

The checkout page 206 shows an example load time of ten seconds. Again, tags 1 and 2 are executed on this page, but since they are already cached, they add little or no time to the load time. Thus, the content load and the page load are about the same at 10 seconds. The idle time on this page is 30 seconds. The idle time is relatively high on this page compared to the cart add page 204 and the product page 202 because the user may be entering checkout details such as billing information and shipping information on the cart add page 204. In general, whenever a page includes a form for a user to fill out (or a video to watch, audio file to listen to, or a large amount of text to read), a significant amount of page idle time may occur.

The receipt page 208 shows a content load time of ten seconds. Again, tags 1 and 2 are cached and executed and do not add substantially to the content load time. However a new tag 3 and another new tag 4 are both loaded and executed on the receipt page 208. Tags 3 and 4 each have a load time of one second in this example, and therefore the total load time is 12 seconds. The idle time on the page, however, is five seconds, which represents a typical scenario where a user, once receiving confirmation that a purchase has been consummated, may quickly leave the page, having no further interest in browsing on that page. As a result of the users leaving the page so quickly, the tags 3 and 4 may not actually load in time to collect any data about that user. Tags not loading on the receipt page 208 may be an unfortunate loss of site visitor data since the receipt page 208 may contain interesting information about the user's purchase.

While the loading of two tags may not significantly impact the loading of the content page, many content sites commonly use 20 to 40 tags on some content pages. This is particular true on receipt pages, which tend to invoke many tags. Thus, if each tag takes a second to load (or some other amount of time) it is probable or highly likely that some or all of those tags may be delayed from loading and may not fully load and execute prior to the user leaving the page. Further, if the tags load synchronously, they may delay the loading of the entire page 208. If the tags load asynchronously, they may not necessarily delay the loading of the content on the page but may instead delay loading themselves, and thus may be missed for execution when the user leaves the page.

Figure 2B:
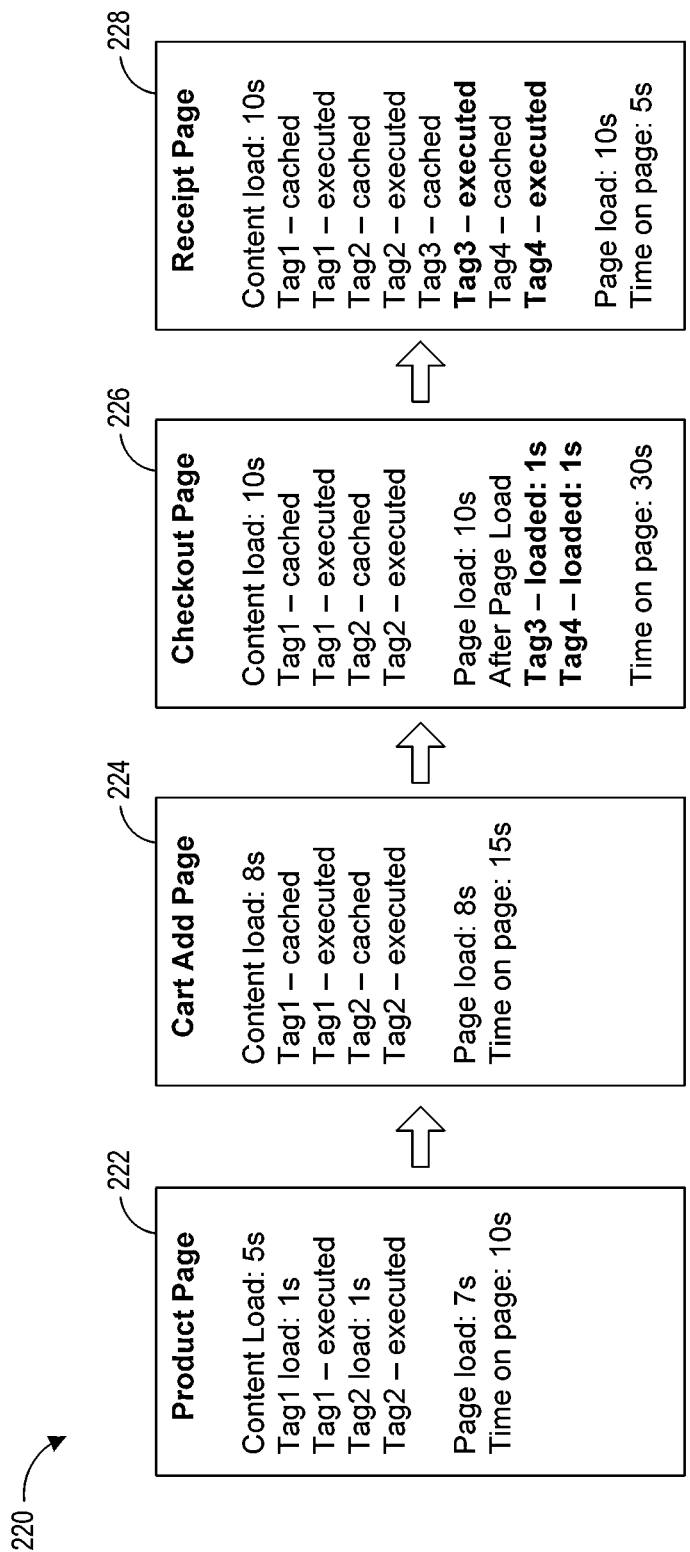

Referring to FIG. 2B, another example tag loading scenario is shown in the context of an example sequence 220 of pages. The sequence includes the same general pages as in FIG. 2A but with prefetching of tags enabled. Thus, the sequence 220 includes an example product page 222, cart add page 224, checkout page 226, and receipt page 228. Each of these pages has the same content load time and idle time shown as in FIG. 2A. However, the page load times differ in some respects because certain of the tags are prefetched.

Tags 1 and 2 are loaded on the product page 222, executed on that page 222, and are subsequently cached for execution on the cart add page 224 and the checkout page 226. However, after the checkout page 226 is loaded, the checkout page prefetches or preloads tags 3 and 4, which are not to be executed on the checkout page 226 itself but are to be executed on the receipt page 228. The prefetching of these tags may occur during the idle time on the page. The idle time on the checkout page 226 is 30 seconds in this embodiment, which may occur because the user has been entering billing and/or shipping information. Due to this idle time, there is time to prefetch tags 3 and 4 so that they do not need to be loaded on the receipt page 228 itself.

Consequently, the receipt page 228 is able to rapidly access tags 3 and 4 from cache and execute them without substantially impacting the page load time of the receipt page 228. As a result, in certain embodiments, execution of these tags may occur before the user leaves the receipt page 228 so that analytics can be collected on that user.

Figure 2C:
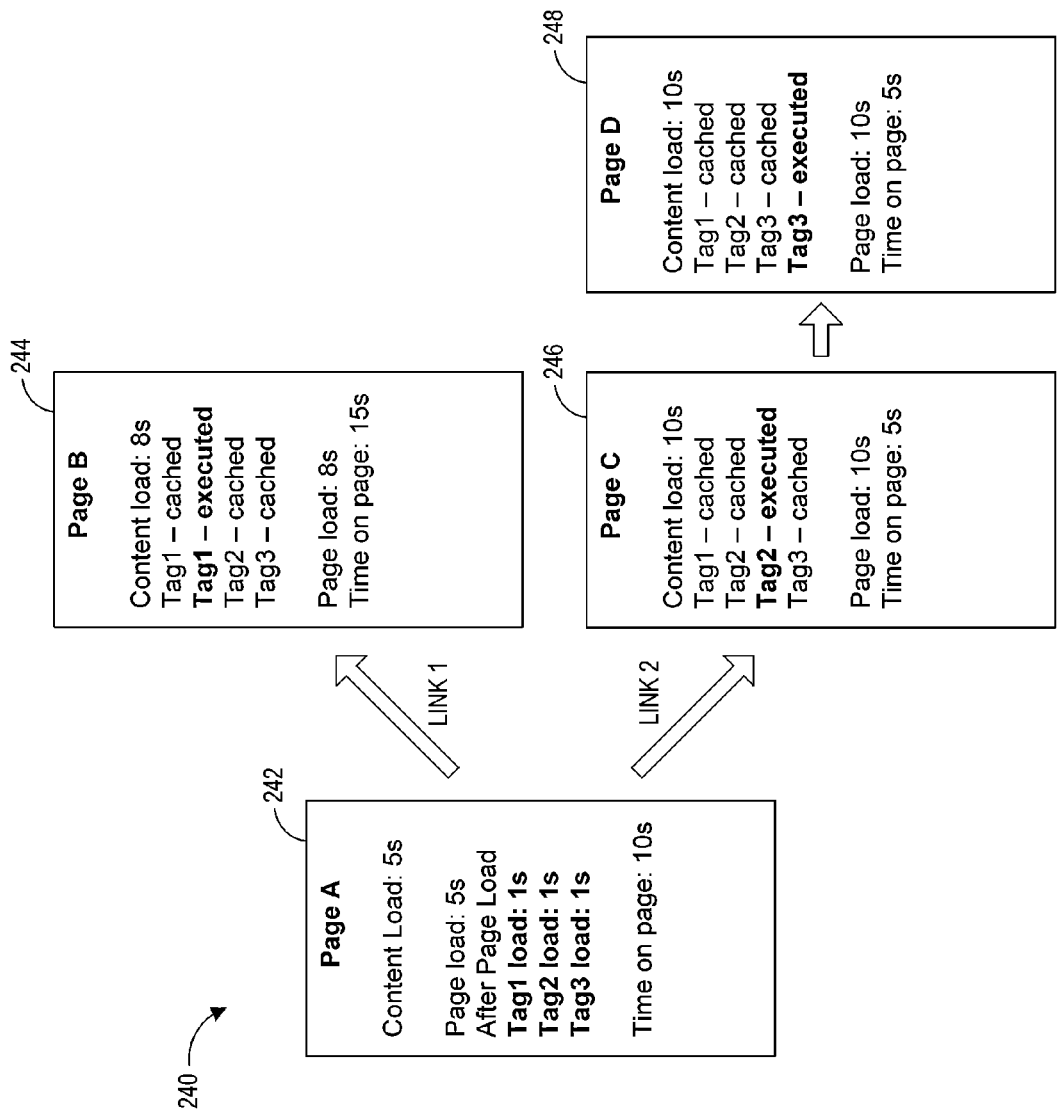

Referring to FIG. 2C, yet another example tag loading scenario is shown in the context of an example sequence 240 of pages. The sequence includes Pages A, B, C, and D with prefetching of tags enabled. The sequence illustrates how tags can be loaded from one or more possible later pages and prefetched according to tag management user settings or a predictive algorithm. Page A 242 includes end user selectable links to at least Page B 244 and Page C 246. When an end user selects link 1 while on Page A 242, the browser 203 can navigate to Page B 244. On the other hand, when the end user selects link 2 while on Page B 244, the browser 203 can navigate to Page C 246. Moreover, when the end user selects a link while on Page C 246, the browser 203 can navigate to Page D 248.

After Page A 242 is loaded, Page A 242 prefetches or preloads tags 1, 2, and 3, which are not to be executed on Page A 242 itself but are to be executed on one or more of Page B 244, Page C 246, and Page D 248. The prefetching of these tags may occur during the idle time on Page A 242. The idle time on Page A 242 is 10 seconds in this embodiment, which may occur because the user performing one or more operations or reviewing information on Page A 242. Due to this idle time, there is time to prefetch tags 1, 2, and 3 so that they do not need to be loaded on Page B 244, Page C 246, and Page D 248 themselves.

Consequently, Page B 244, Page C 246, and Page D 248 are respectively able to access tags 1, 2, and 3 from cache and execute them without substantially impacting the page load time of Page B 244, Page C 246, and Page D 248. As a result, in certain embodiments, execution of the tags 1, 2, and 3 may occur before the user leaves Page B 244, Page C 246, and Page D 248 so that analytics can be collected on that user.

One or more tags, such as a master tag described herein, can include information on tags to prefetch in some embodiments. The information on the tags to prefetch can, for example, be determined by an analytics system, such as the tag management system 150, that can analyze end user traffic on the various pages and determine tags that may be desirably prefetched according to one or more predictive algorithms. The analytics systems can consider factors such as end user time on pages, page load times, end user link selection sequences, tag load times, and the like when determining tags to indicate to prefetch. In another example, the information on the tags to prefetch can be determined by the analytics system according to settings provided by a tag management user, such as instructions by the tag management user to prefetch one or more particular tags on one or more particular pages.

In certain embodiments, a prioritized prefetch list can be followed when determining whether to prefetch one or more tags, and tags can continue to be prefetched so long as an end user remains idle on one or more pages of a content site. For instance, if the prioritized prefetch list includes ten tags to prefetch for the content site, the first three tags on the prioritized prefetch list can be prefetched on one page of the content site during idle time before an end user selects a link to navigate to a next page of the content site. Once the end user has loaded the next page, the remaining seven tags can further be prefetched during idle time while on the next page.

V. Example Prefetch Processes

Figure 3:
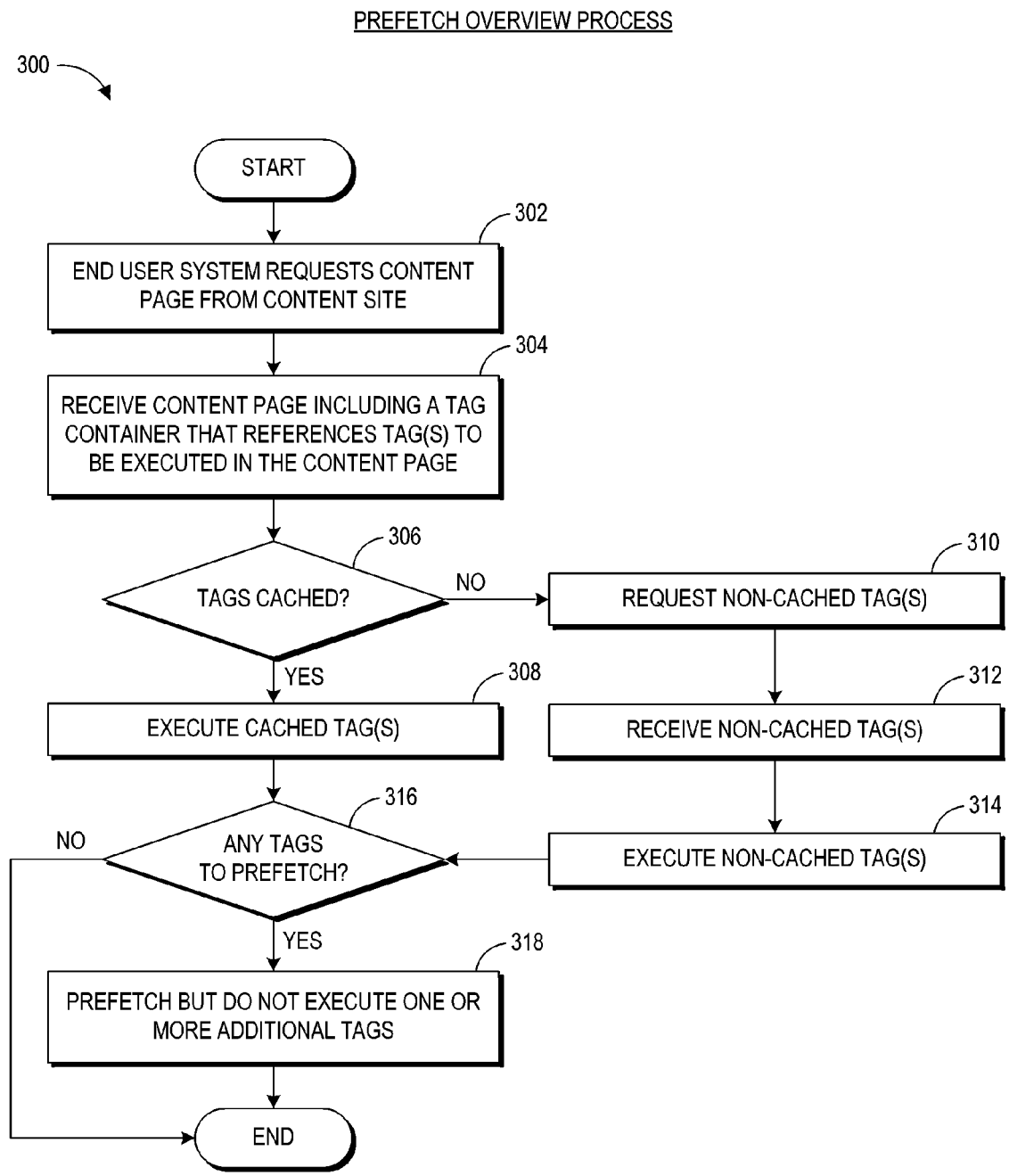
FIG. 3 depicts an embodiment of a prefetch overview process.

Turning to FIG. 3, in example prefetch overview process 300 is shown. The prefetch overview process 300 can advantageously enable prefetching of tags and execution of prefetched tags. For convenience, the prefetch overview process 300 is described as being implemented by components of the computing environment 100 described above with respect to FIG. 1. However, the prefetch overview process 300 is not limited as such and may be implemented by any other system described herein or components thereof, or other computing devices or systems comprising physical computer hardware and/or software.

At block 302, an end user system 102 requests a content page 112 from a content site 110, for example with the browser 103 of the end user system 102. The end user system 102 receives the content page 112 including a tag container 114 that references tags 116 or 118 to be executed in the content page 112 at block 304. In an embodiment, the content page 112 references a master tag 116 that may be stored on a tag server 120. This master tag 116 may call other tags such as the tags 116 or 118. These tags may be implemented synchronously, asynchronously, or both.

At block 306, the end user system 102 (e.g., the browser 103 of the end user system 102) determines whether any of the tags referenced by the master tag are cached. If so, the browser 103 can execute the cached tags at block 308. If not, the process 300 can proceed to blocks 310 through 314, where the non-cached tags are requested (block 310), received from a tag server 120 (block 312), and executed (block 314). However, the tags referenced at block 304 may include both tags that are cached and tags that are not cached. Thus, both blocks 308 and 310 through 314 may be selected at the decision block 306, such that the cached tags are executed at block 308 and the non-cached tags are requested, received, and executed at blocks 310 through 314.

Once the non-cached tags are received and executed, the browser 103 may also cache them for subsequent execution. The tags that are cached and executed at block 308 may have been cached in such a process or may have been prefetched. At block 316, the master tag loaded in the browser 103 of the end user system 102 can determine whether there are any tags to prefetch. The master tag may include a reference to tags to prefetch or may access the tag management system 150 to determine if there are any tags to prefetch (see FIGS. 4A and 4B, described below).

If there are tags to prefetch, then the end user system prefetches but does not execute one or more additional tags at block 318. For instance, the master tag can load one or more additional tags in memory or browser cache but not run those tags. The master tag can prefetch the tags during idle time on the page, or more generally, after content for that page and/or tags for that page have been loaded. The master tag needs not determine whether sufficient idle time on the page is occurring to prefetch tags for a subsequent page in some embodiments because if a transition to the subsequent page occurs mid-prefetch, those tags may be requested again by that subsequent page. Thereafter, or if there are no tags to prefetch, the process 300 ends.

Figure 4A:
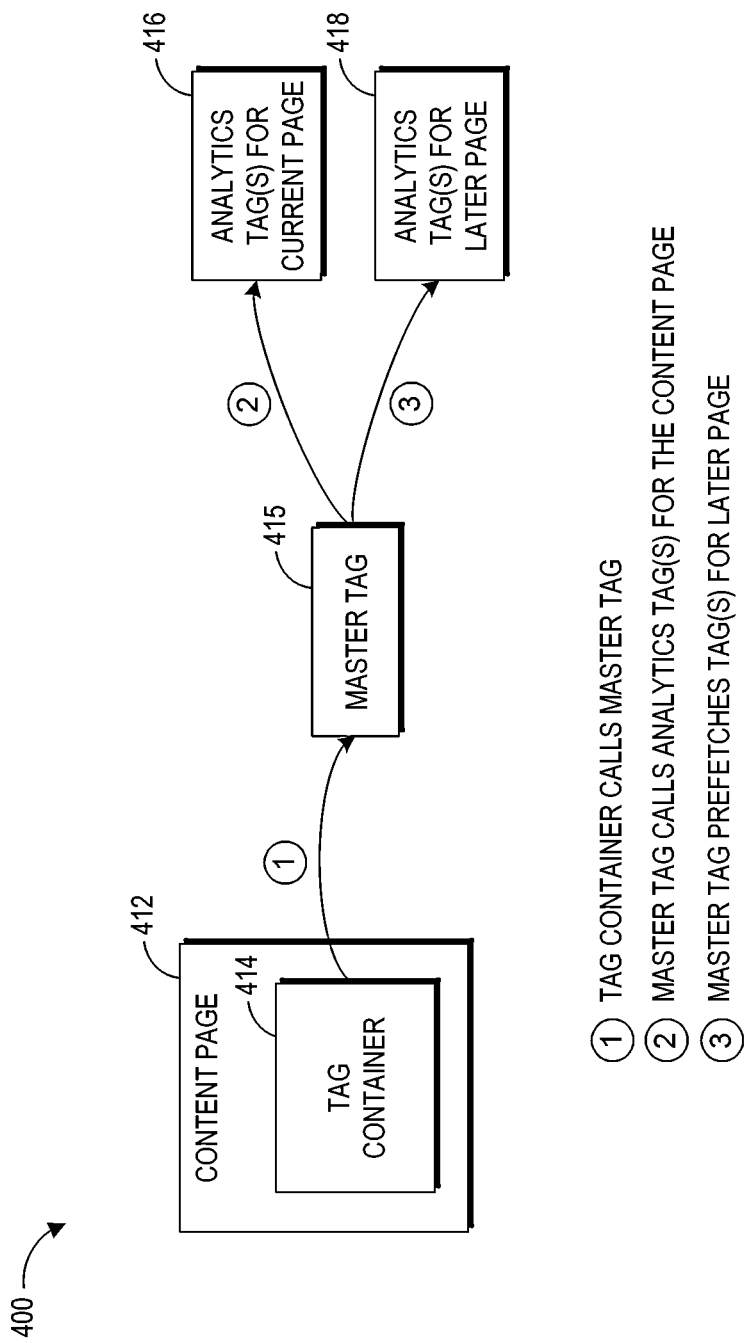
FIGS. 4A and 4B depict embodiments of state flow diagrams for prefetching tags.

Turning to FIG. 4A, an example of a state flow diagram 400 is shown that depicts another perspective of an embodiment of the process 300. In the state flow diagram 400, example states may be executed by the browser 103 of the end user system 102, or more generally by a hardware processor of the end user system 102. In FIG. 4A, a content page 412 is shown with a tag container 414, as in FIG. 1. A master tag 415 is also shown and digital tags for the current page 416 and digital tags 418 for a later page are also shown. As used herein, in addition to having its ordinary meaning, the terms "later page," "subsequent page," and the like can refer to a page that is linked to the current page loaded or loading in a user's browser (e.g., the current page 416) via a link or a chain of links through one or more additional pages. Pages in the chain of one or more links can be within or outside a content site's domain of the current page. State transitions are represented by circled numbers in the FIG. 4A.

At state 1, the tag container 414 in the content page 412 calls the master tag 415, which may be stored on one of the tag servers 120. At state 2, the master tag 415 calls digital tags 416 for the current content page 412, unless those digital tags 416 are already cached in the browser 103 of the end user system 102. The digital tags 416 may then be executed as described above with respect to the process 300.

At state 3, the master tag 415 prefetches the tags 418 for one or more known or possible later pages, such as for two or more later pages. For example, referring to FIG. 2C, tags 1 and 2 can be prefetched on Page A 242 for later execution on either Page B 244 or Page C 246, or tags 2 and 3 can be prefetched on Page A 242 for later execution on Page C 246 and Page D 248. The master tag 415 may include a reference to those tags 418 to be prefetched as described above and may load them but not execute them. For instance, the master tag 415 may include both loading and execution routines that load and execute tags, respectively. Each of the tags 416, 418 may have a wrapper class or function wrapped around them that allows them to be executed when they are called for execution by a routine in the master tag 415. The master tag 415 can apply the load and execution routines of any of the digital tags 416 for the current page while applying just the load routine to the digital tags 418 for a later page.

Figure 4B:
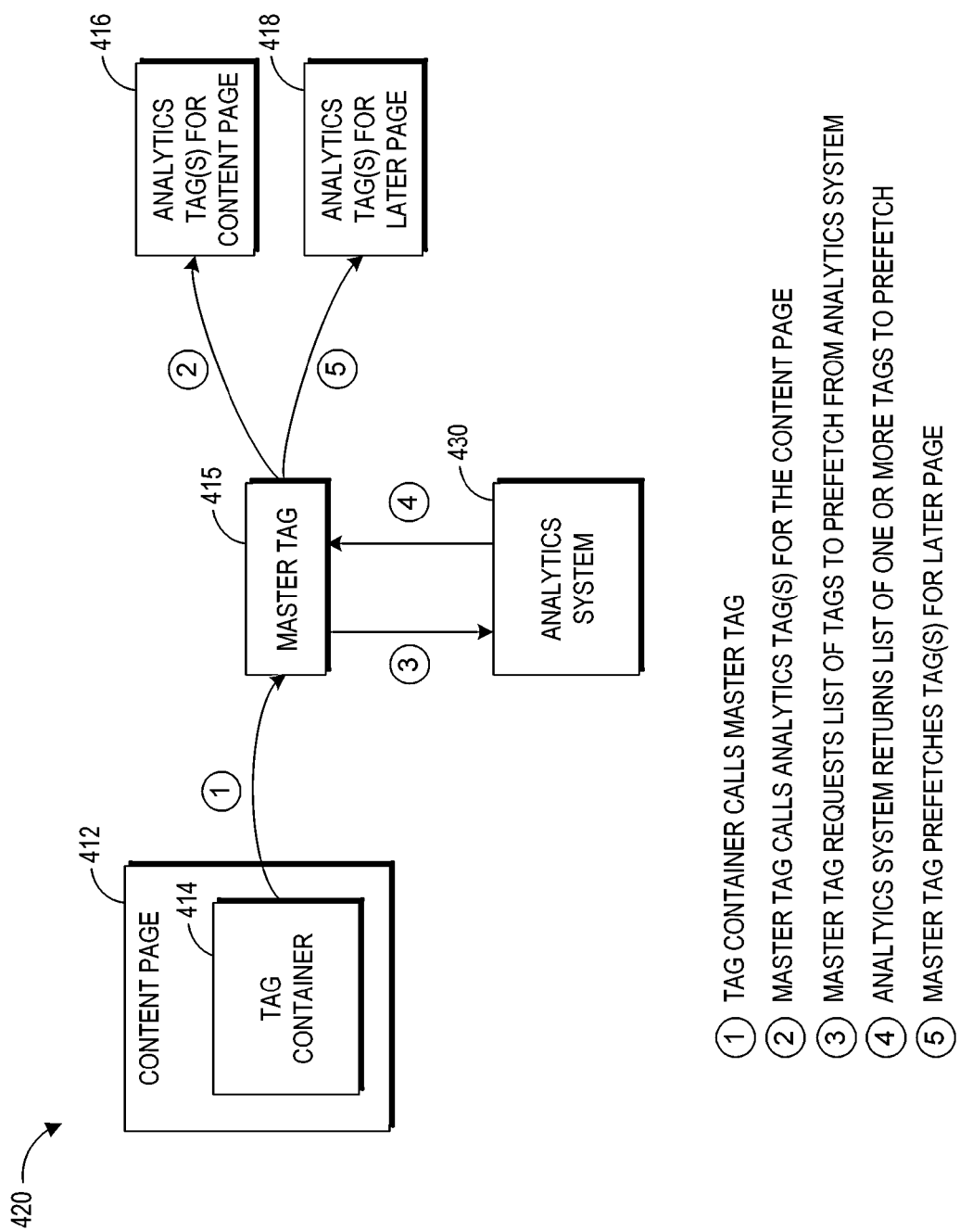

Turning to FIG. 4B, another example state flow diagram 420 is shown that depicts another example perspective of an embodiment of the process 300. In the state flow diagram 420, the content page tag 420, tag container 414, master tag 415, and tags 416, 418 are again shown. In addition, an analytics system 430 is also shown, which represents an embodiment of the analytics system 130. State flow transitions are also represented by circled numbers in the FIGURE.

At state 1, the tag container 414 calls the master tag 415, and at state 2, the master tag 415 calls one or more digital tags 416 for the current content page 412. Thereafter, the master tag 415 requests a list of tags to prefetch from the analytics system 430 at state 3. The analytics system 430 returns a list of one or more tags to prefetch at state 4, and the master tag 415 prefetches those digital tags 418 for a later page at state 5.

The difference between FIGS. 4B and 4A is that the master tag 415 may not have an internal list of the digital tags 418 to prefetch in FIG. 4B but instead contacts the analytics system 430 to determine which tags to prefetch. This scheme shown in FIG. 4B may be advantageous if it is desired to not update the master tag 415 each time different prefetch options are configured for the content pages 412. Alternatively, the scheme shown in FIG. 4A may be more efficient because the master tag 415 may not need to contact the analytics system 430 over a network to determine which tags to prefetch, thereby potentially saving tag loading time.

Figure 5:
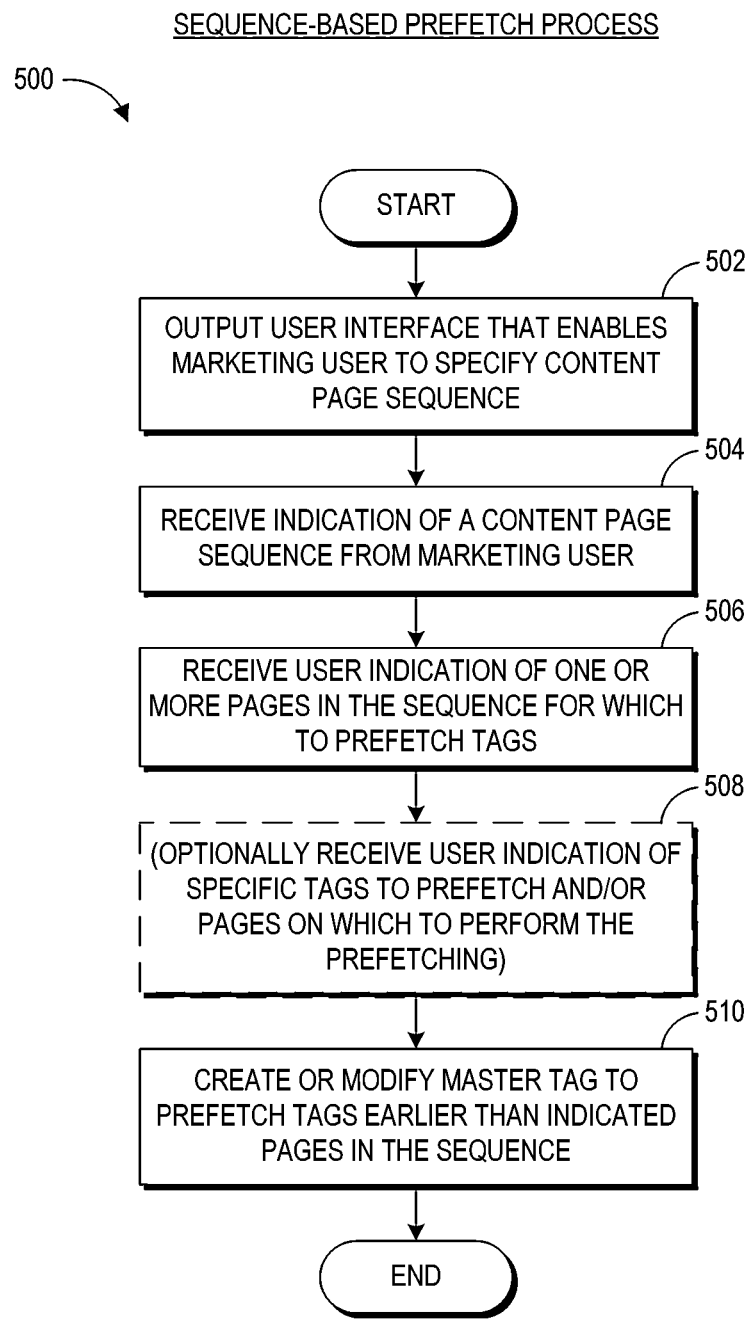
FIG. 5 depicts an embodiment of a sequence-based prefetch process.

Turning to FIG. 5, an example sequence-based prefetch process 500 is shown. The sequence-based prefetch process 500 can provide a way for a tag management user to specify a content page sequence, similar to the content page sequences shown in FIGS. 2A and 2B, to thereby enable prefetching on specified pages of the sequence. For convenience, the sequence-based prefetch process 500 is described as being implemented by components of the computing environment 100 described above with respect to FIG. 1. However, the sequence-based prefetch process 500 is not limited as such and may be implemented by any other system described herein or components thereof, or other computing devices or systems comprising physical computer hardware and/or software.

At block 502, the tag management system 150 outputs a user interface that enables a tag management user to specify a content page sequence. An example of such a user interface is described below with respect to FIG. 8. At block 504, the tag management system 150 receives an indication of a content page sequence from the tag management user. For example, the tag management system 150 may receive the user input of the sequence from the provided user interface.

At block 506, the tag management system 150 receives a user indication of one or more pages in the sequence for which to prefetch tags. The user may specify through the user interface that tags may be prefetched on any page of the sequence. However, in an embodiment, tags may not be prefetched on the first page of the sequence unless the first page of the sequence follows another sequence that has been specified by the user. In other embodiments, any page can be part of a larger sequence detected by the content profile module 160, as will be described in greater detail below with respect to FIG. 6.

In one embodiment, the user can instead specify through the user interface which pages to optimize or improve loading without having to specify the tags that are to be prefetched. Alternatively, the user may specify through the user interface that general prefetching is to be used, and the tag management system 150 can then intelligently determine which pages in the sequence to prefetch. For instance, the tag management system 150 can identify a tag to be executed in a later page of the sequence and identify a previous page in the sequence in which to prefetch that tag. This preceding page may, but need not, be the directly preceding page of the page on which those tags are to be executed. Instead, the tag management system 150 may select any earlier page in the sequence to prefetch the tag on, including the beginning page in the sequence. Moreover, the tag management system 150 may load some or all the tags to be executed in the sequence on the first page of the sequence (or another page). Further, the tag management system 150 may, in some embodiments, load all tags for a content site in the first page of the content site that an end user accesses.

Optionally, at block 508 the tag management system 150 can receive a user indication of specific tags to prefetch and/or pages on which to perform the prefetching. For instance, the provided user interface can provide options for the user to specify which tags to prefetch and/or on which page to perform the prefetching. Further, the tag management user may also be able to specify through the user interface which pages include hypertext markup language (HTML) forms or which otherwise are expected to include significant idle time so that the tag management system 150 can intelligently determine which page to load tags on. Pages with HTML forms or that have expected idle time can be good candidates for prefetching tags because of the extra time that may be available to prefetch tags on those pages.

At block 510, the tag management system 150 can create or modify a master tag to prefetch tags earlier than the indicated pages in the sequence on which those tags are to execute. Alternatively, the tag management system 150 can update the data store 180 to include information on which content pages are to prefetch which tags so that the master tag can query the analytics system 130 at runtime (as in FIG. 4B).

Figure 6:
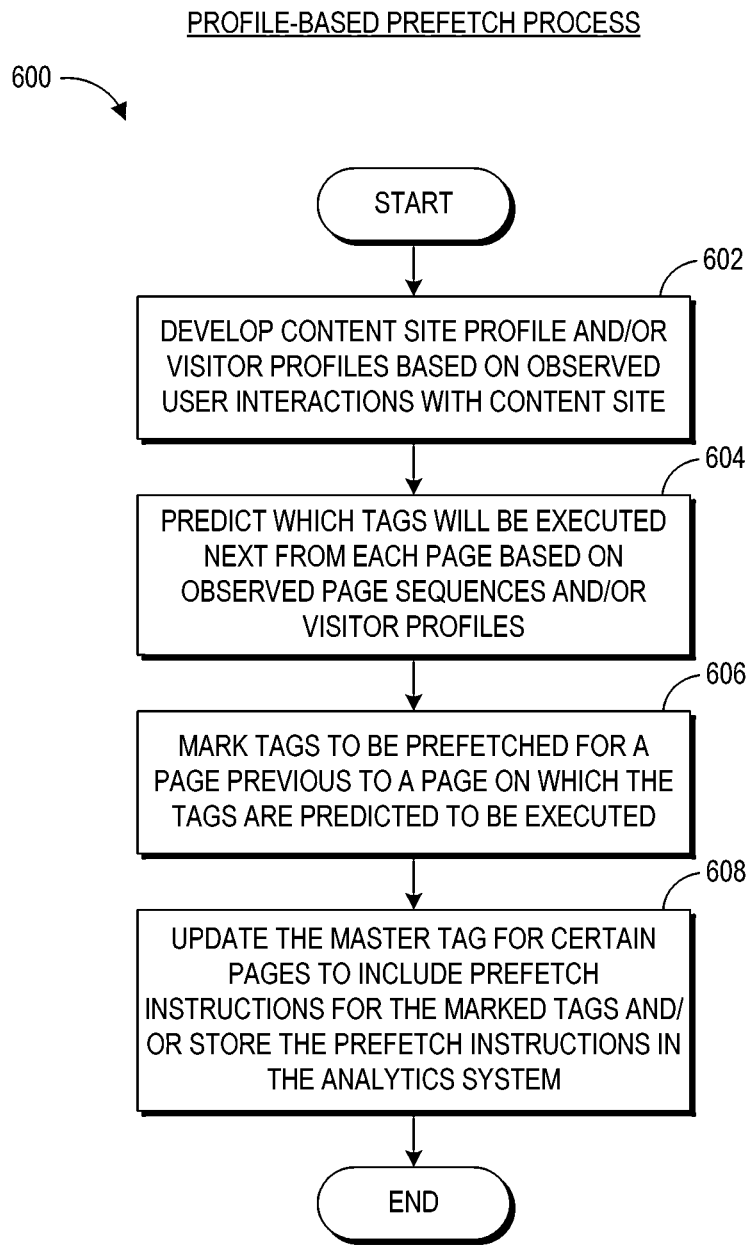
FIG. 6 depicts an embodiment of a profile-based prefetch process.

FIG. 6 depicts an embodiment of a profile-based prefetch process 600. Advantageously, in certain embodiments, the profile-based prefetch process 600 can automatically identify sequences that may exist in a content site's pages that may indicate the possibility of prefetching tags on pages of the content site. In addition, the process 600 can use visitor data to enhance the profile of a content site for the purposes of tag prefetching. For convenience, the profile-based prefetch process 600 is described as being implemented by components of the computing environment 100 described above with respect to FIG. 1. However, the profile-based prefetch process 600 is not limited as such and may be implemented by any other system described herein or components thereof, or other computing devices or systems comprising physical computer hardware and/or software.

At block 602, the tag management system 150 develops a content site profile and/or a visitor profile based on observed user interactions with the content site. With respect to developing a content site profile, the analytics system 130 can collect data from tag containers or master tags in different content pages that indicate the typical flow from content page to content page. The master tag (or tag container) for each content page may report to the tag management system 150 that it has loaded so that the tag management system 150 can build a directional graph of pages as they are accessed by end users. The tag management system 150 can also track the number of times that successive pages were selected by end user systems. The resulting graph can include nodes that represent content pages and edges having values that represent (for example) the number of times a user navigated from a first page connected to an edge to a second page connected to the edge. The edges may represent this information in other ways, such as by a probability that a page transition may occur (represented, for example, by the number of users who went from one page to another divided by the total number of page requests or the like). The edges and/or nodes may also have other statistics associated therewith.

In addition, the visitor processing system 140 of the analytics system 130 can develop visitor profiles based on observed end user interactions with the content site. These visitor profiles can be used to enhance the profile of the content site described above to facilitate intelligent prefetching. The observed visitor profiles may be built using any of the features described in U.S. application Ser. No. 14/149,717, filed Jan. 7, 2014, titled "Content Site Visitor Processing System," which is hereby incorporated by reference fully herein. For instance, the visitor profiles can be built by the visitor processing system 140 using attributes and/or rules that specify visitor profiles for different types of users. As an example, visitor profiles can be defined in part by badges created for visitors that have certain characteristics, such as a badge to represent a user that adds items to a shopping cart without purchasing or a badge to represent a user that makes numerous purchases.

At block 604, the analytics system 130 can predict which tags will be executed next from each page of a content site based on the observed page sequences and/or visitor profiles. With respect to observed page sequences, the tag management system 150 can calculate the probability that a content page will be accessed following another content page to predict which tags will be executed next from each page. The tag management system 150 can calculate the probability as described above with respect to edge values of the content site profile graph. Since the tag management system 150 can access the graph to determine the probable order in which pages are to be accessed, the tag management system 150 can predict which tags are likely to be executed ahead of time. As a result, the tag management system 150 can use the content site profile graph to determine which tags to prefetch on which pages.

The tag management system 150 can refine the results of the content site profile graph in one embodiment by taking into account visitor profile data. For instance, the visitor processing system 140 may determine that 80% of visitors who added more than $30 of products to their electronic shopping cart typically purchase, and thus the probability of such a user going from a checkout page to a receipt page is relatively high. Thus, the tag management system 150 can modify values of edges between checkout pages and receipt pages in the content site profile graph to reflect this increased probability based on the visitor profiles.

Thus, for example, the master tag or the tag management system 150 may determine in real time or near real time based on the visitor profile of a particular end user whether the end user has added $30 or more of products to his or her cart. If so, the master tag or the tag management system 150 can prefetch tags for the next page indicated in the content site profile graph.

More generally, at block 606, the analytics system 130 can mark tags to be prefetched for a page previous to a page on which the tags are predicted to be executed based on either the observed page sequences and/or the visitor profile information. At block 608, the analytics system 130 can update the master tag for certain pages to include prefetch instructions for the marked tags and/or store the prefetched instructions in the analytics system 130 for access by master tags using, for example, the features described above with respect to FIG. 4B. The prefetch instructions can include logic for determining whether the user matches a certain visitor profile that would predict that the user is likely to select a subsequent page, enabling the master tag to prefetch tags accordingly.

Figure 7:
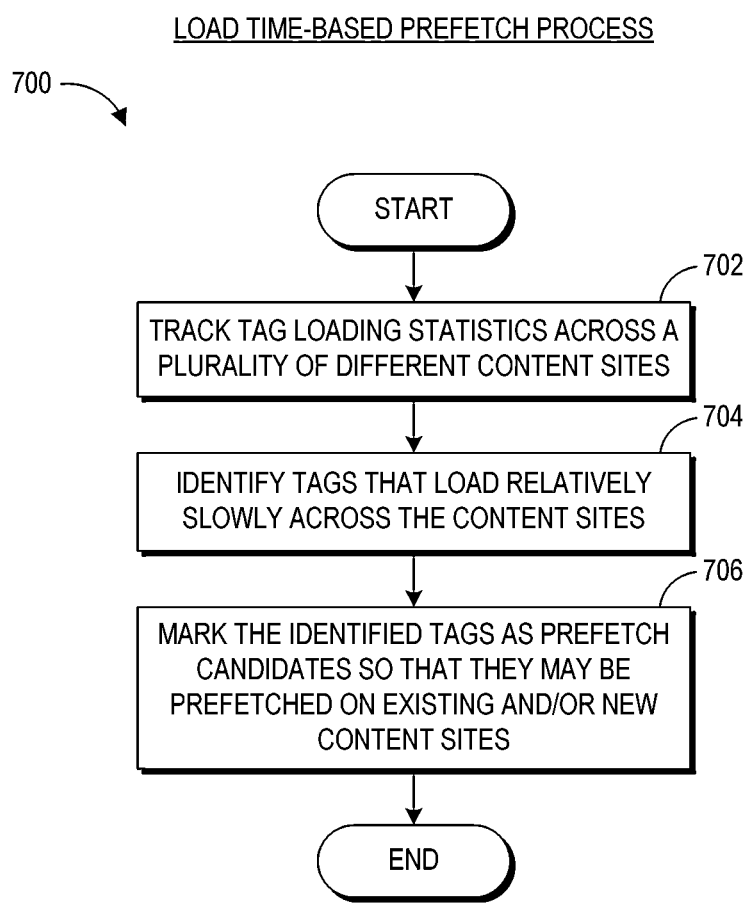
FIG. 7 depicts an embodiment of a load time-based prefetch process.

Turning to FIG. 7, an embodiment of a load time-based prefetch process 700 is shown. In the example process 700, prefetching of tags can be determined based on statistics associated with individual tags. For convenience, the load time-based prefetch process 700 is described as being implemented by components of the computing environment 100 described above with respect to FIG. 1. However, the load time-based prefetch process 700 is not limited as such and may be implemented by any other system described herein or components thereof, or other computing devices or systems comprising physical computer hardware and/or software.

At block 702, the analytics system 130 tracks tag loading statistics across a plurality of different content sites. By tracking tag loading statistics across a plurality of content sites, the analysis system 130 can determine or identify tags that load relatively slowly across the content sites at block 704. Statistics that may be tracked can include the average load time of the tags, the median load time of the tags, or any other statistic associated with load time of the tags or other characteristics of the tags. In addition, outlier values such as extremely long load times or extremely short load times may be discarded so as to develop a more representative average load time for the tags.

Tags may load slowly for a variety of reasons. They may load slowly because they are of large size or because the network on which they are hosted has high latency or low bandwidth. Such tags may be good candidates for prefetching because they may otherwise slow down the loading of a content site or may not load fast enough to be executed before the end user leaves a page. Slow tags may be identified in an embodiment by ranking tags by their average/median load times and thresholding the tags to determine which of the load times are larger than others. Tags that meet or are above a certain load time threshold, for instance, may be considered slow-loading relative to other tags.

At block 706, the tag management system 150 marks the identified slow tags as prefetch candidates so that they may be prefetched on existing and/or new content sites. The tag management system 150 may update existing master tags for existing content pages known to or expected to precede content pages that execute the slow tags. In addition, the tag management system 150 may update the data store so that the slow tags are marked as prefetch candidates so that the tags can be prefetched for any new content pages that reference those tags in the future.

The embodiments shown in FIGS. 5, 6, and/or 7 may also be combined. For instance, the predicted sequence described above with respect to FIG. 6 or the graph constructed with respect to FIG. 7 may be modified to include information about tag load times. The tag management system 150 may then prioritize prefetching those tags in the sequence or graph that have slow load times. In addition, the graph of FIG. 6 could be modified to include the user-specified sequence(s) of FIG. 5. Edge values between nodes of a sequence may be equal to 1 (or the like) to indicate a probability of 1 that a traversal between such nodes may be made. Alternatively, the probability assigned as an edge value between sequence nodes can be a high probability value other than 1.

VI. Example User Interfaces for Configuring Prefetch Options

Figure 8:
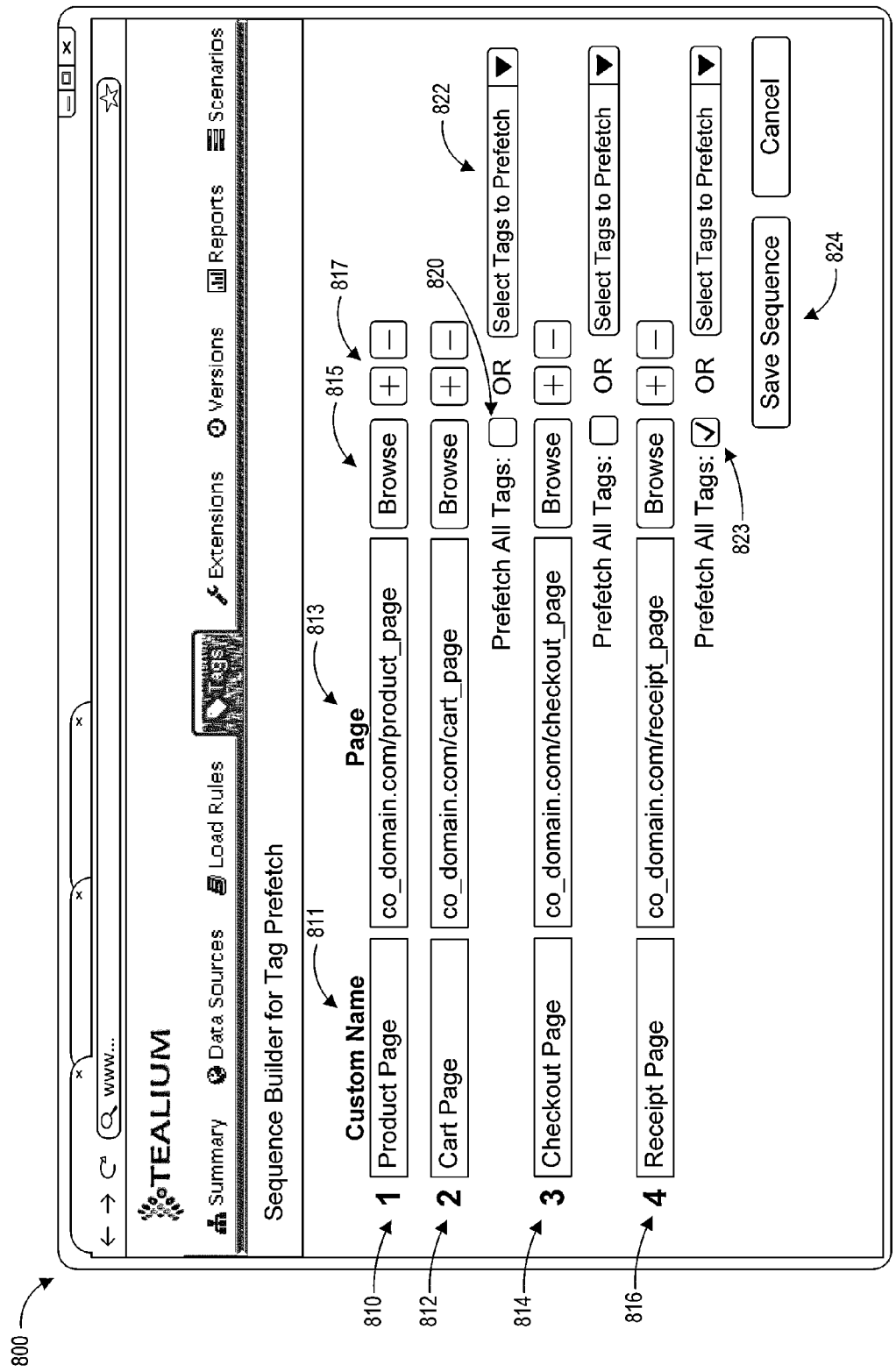
FIG. 8 depicts an example user interface that can allow users to specify different prefetch or load rules for a page sequence.

Turning to FIG. 8, an example user interface 800 is shown that can allow users to specify different prefetch or load rules for a sequence as well as specify a sequence of pages. The user interface 800 may be generated by the tag management system 150 and provided as a webpage or the like to the tag management user systems 104 for output in the browser 105. In the depicted embodiment of the user interface 800, different content pages 810, 812, 814, 816 are specified by the user in a sequence. Numbers 1 through 4 next to the pages 810, 812, 814, 816 represent steps in the sequence. These pages correspond to the example pages described above with respect to FIG. 2B and include a product page 812, cart page 814, checkout page 816, and receipt page 818. A user can specify a custom name for the product page using name fields 811 as well as specify a uniform resource locator (URL) for the page itself using a page field 813. Alternatively, the user can browse a file system for a content page to find the name or file system path of the page using browse buttons 815. Using add and delete buttons 817, the user can insert a page into the sequence or delete a page from the sequence.

On each page 810, except for optionally the first page 810, an option box 820 is provided for prefetching all tags on the page. One of the prefetch boxes 823 is shown as selected. Select boxes 822 are also provided to allow users to select specific tags to prefetch on each page. Users can save a created sequence using a save sequence button 824.

Figure 9:
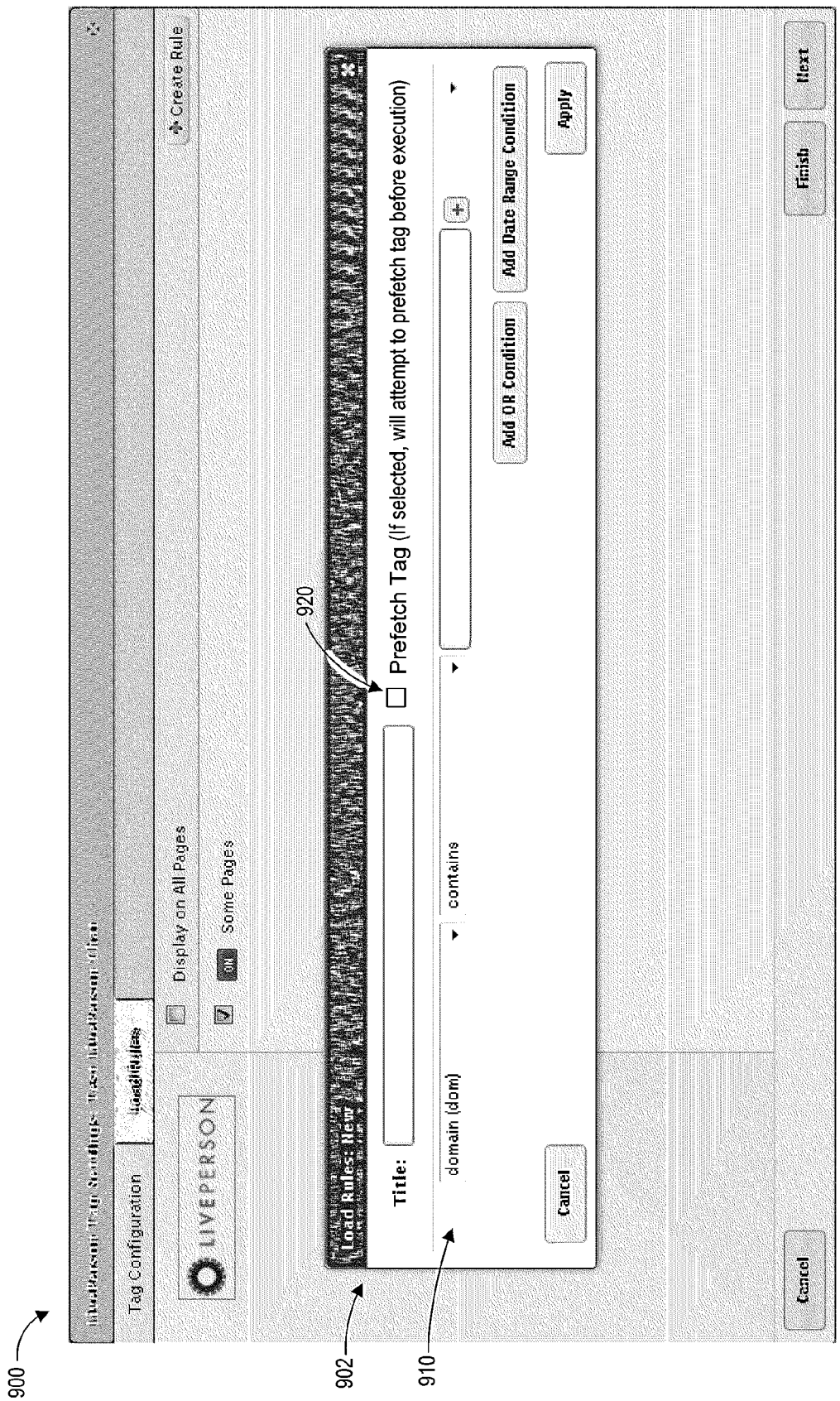
FIG. 9 depicts an example user interface that enables a user to specify that a tag is to be prefetched.

Turning to FIG. 9, another example user interface 900 is shown that enables a user to specify that a tag be prefetched. The user interface 900 may be generated by the tag management system 150 and provided as a webpage or the like to the tag management user systems 104 for output in the browser 105. In this particular embodiment, the user interface 900 includes a pop-up box 902 that enables a user to specify load rules for a particular tag, including which pages to load the tag, using user interface controls 910. In addition, a check box 920 in the pop-up box 902 allows the user to specify whether to prefetch the tag. If the user selects the check box 920 to prefetch the tag, then the tag management system can store in any master tag for a page preceding a page that uses this tag a directive to attempt to prefetch the tag before execution. A tag may be prefetched as part of a sequence or may generally be prefetched based on the content site profile developed above with respect to FIG. 7. In the depicted example, a "LivePerson" chat tag is selected, which is an example of a tag that may load slowly on a page. Thus, it can be beneficial to provide tag management users with the option to request prefetching for such a tag.

As another approach to the load rules shown in FIG. 9, the tag management system 150 may output a user interface similar to FIG. 9 that enables a tag management user to specify one or more load rules that define which content pages to execute a tag on and which content pages to prefetch a tag on. For instance, the user may define a first load rule that specifies that a tag is to be executed on a receipt page and a second load rule that specifies that the tag is to be prefetched on a checkout page (or a single load rule that specifies both actions). The tag management system 150 can then update the master tag for the checkout page to prefetch the tag and can update the master tag for the receipt page to execute the tag. In other embodiments, such as in the scenario of FIG. 4B, the master tag for the checkout and receipt pages can query the tag management system 150 (or analytics system 430) to determine which tags to prefetch or execute on any given page, including the checkout and receipt pages.

Each of the user interfaces 800, 900 shown includes one or more user interface controls that can be selected by a tag management user, for example, using a browser (e.g., the browser 105) or other application software. The user interface controls shown are merely illustrative examples and can be varied in other embodiments. For instance, buttons, drop-down boxes, select boxes, text boxes, check boxes, slider controls, and other user interface controls shown may be substituted with other types of user interface controls that provide the same or similar functionality. Further, user interface controls may be combined or divided into other sets of user interface controls such that similar functionality or the same functionality may be provided with very different looking user interfaces. Moreover, each of the user interface controls may be selected by a user using one or more input options, such as a mouse, touch screen input, or keyboard input, among other user interface input options.

VII. Detailed Example Computing Environments

Figure 10:
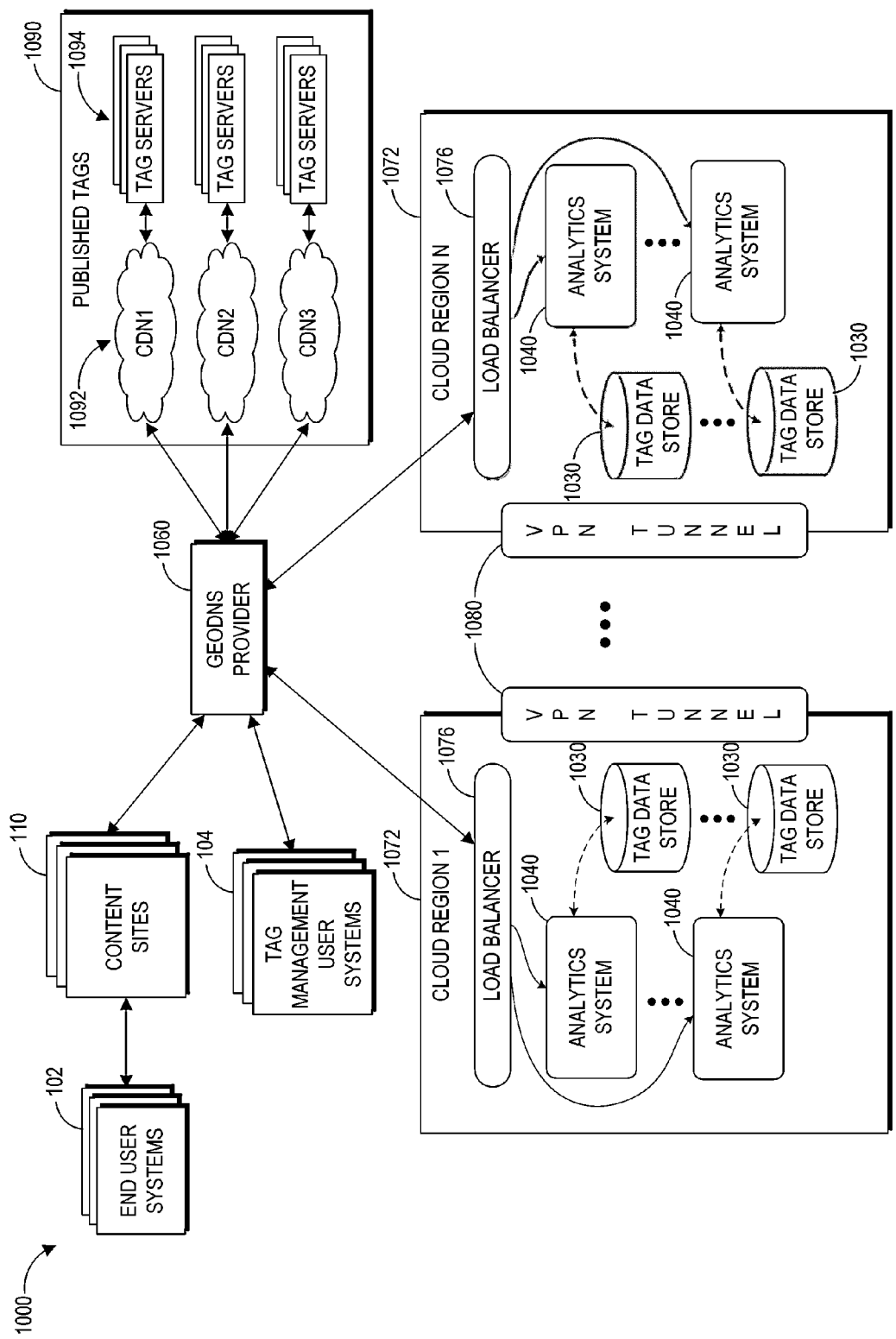
FIG. 10 depicts another embodiment of a computing environment, which provides distributed cloud-based access to an analytics system.

Turning to FIG. 10, a more detailed example embodiment of a computing environment 1000 is shown that can perform any of the analytics features described herein. The computing environment 1000 is a more detailed example of implementation of the computing environment 100 of FIG. 1. As in FIG. 1, end user systems 102 are shown in communication with content sites 110 which may communicate over a network (not shown). In addition, tag management user systems 104 are also shown. The computing environment 1000 facilitates implementation of an analytics system 1040, which may include the functionality of the analytics systems 130 or 430 described above.

In the depicted embodiment, the analytics system 1040 is shown distributed in a cloud platform that provides redundant and geographically dispersed access to the analytics system 1040. In particular, the analytics system 1040 is implemented in various cloud regions 1072. These cloud regions may be implemented in any type of cloud platform, which may simply be a data center operated by a vendor of the analytics system or by a third-party vendor such as Amazon Web Services™, Microsoft Azure™, Rackspace™, Linode™, combinations of the same, or the like. Each cloud region 1072 includes a load balancer 1076 that can balance requests to analytics system instances 1040.

The analytics system instances 1040 can be implemented as virtual machines and/or physical machines. In the Amazon Web Services embodiment, the instances 1040 can be elastic compute cloud (EC2) instances that are distributed geographically for faster and redundant access to geographically dispersed analysis user systems 104. In addition, visitor profile data storage devices 1030 are shown in the different cloud regions 1072 and can store tag and visitor data in the cloud.

Virtual private network (VPN) tunnels 1080 facilitate secure communication in a virtual private network among the different cloud regions 1072 and enable administrator users (not shown) of the analytics system to access analytics system instances 1040.

In an embodiment, the virtual private network is facilitated or provided by a private cloud service, such as the Virtual Private Cloud (VPC) service provided by Amazon Web Services™. The private cloud service can provide security to the analytics system instances 1040 by virtue of obscuring IP addresses of the analytics instances 1040. The analytics system instances 1040 may have nonpublic IP addresses so that each analytics system instance 1040 does not need to have security software that is responsible for securing the analytics system 1040 itself.

A geodns provider 1060 is provided for interfacing between content sites 110, analysis user systems 104, and the various analytics system instances 1040. The geodns provider 1060 can also provide end users with access to published tags 1090 which are stored in tag servers 1094 accessible through one or more or content delivery networks (CDNs) 1092. The function of the geodns provider 1060 in one embodiment is to periodically determine which CDN hosting the tags has the lowest latency, thereby selecting which CDN to point the content site 110 to when accessing tags on the tag servers 1094. The geodns provider 1060 may implement the DYN DNS system in one embodiment.

Advantageously, in certain embodiments, by storing tags in CDNs, tag access can be much faster than if tags were stored in locally hosted tag servers. Further, by using a geodns provider 1060, access to tags can be even more rapidly achieved by cycling through the fastest available CDNs 1092.

VIII. Additional Embodiments

In an embodiment, the master tag 415 of FIG. 4A can include a reference to a second tag (e.g., a second master tag or prefetch tag) for a successive content page in a sequence of content pages. For instance, the master tag for a checkout page can include a reference to a master tag for a receipt page. The first master tag for the first page in the sequence can load the second master tag for the second page in the sequence and then inspect the tags called by the second master tag. The first master tag can then prefetch the tags referenced by the second master tag. Similarly, the master tag 415 of FIG. 4B can call the analytics system 430 to identify a second master tag associated with a next page in a sequence to identify tags called by the second master tag and then prefetch those tags.

In another embodiment, the analytics system 130 can compile idle time statistics regarding content pages on the content site 110. The tag container and/or master tag can report data on page idle times to the analytics system 130 so that the analytics system 130 can use this data to improve tag prefetching. Pages that typically have longer idle times may be good candidates for pages on which tag prefetching can occur. Since end users may spend different amounts of time on the same content page, the analytics system 130 can average idle times for pages to produce an average idle time for a page (or some other statistic such as median, mode, etc.). The analytics system 130 can identify pages that have an average (for example) idle time that meets or exceeds a threshold and mark these pages as pages on which tag prefetching can occur. In one embodiment, the analysis system 130 can update the graph described above with respect to FIG. 6 to include idle time statistics in nodes of the graph (which can correspond to individual content pages).

In yet another embodiment, the master tag can programmatically identify a form or video (or other feature) exists on a content page. The master tag can report this information to the analytics system 130 so that the analytics system 130 can store this information in association with data representing each content page, e.g., in the graph referred to above. The analytics system 130 can use this information much like the idle time statistics to identify pages in which content prefetching may occur. As described above, pages with forms, video, audio files, large amounts of text (which can be determined by thresholding word counts, etc.), can be good candidates for performing prefetching on those pages because end users may spend a significant amount of idle time on those pages.

In an additional embodiment, a system for facilitating digital tag prefetching includes a computer system comprising physical computer hardware. The computer system can be configured to electronically generate a user interface that provides functionality for a tag management user to specify one or more load rules with respect to content pages of a content site. The one or more load rules can govern prefetching of a digital tag on one or more of the content pages. The computer system can be further configured to (1) receive, through the user interface, first input from the tag management user specifying a first content page of the content pages on which to execute a first digital tag and (2) receive, through the user interface, second input from the tag management user specifying a second content page of the content pages on which to prefetch the first digital tag. In addition, the computer system can be configured to store the first and second inputs as one or more first load rules configured to cause the first digital tag to be prefetched on the second content page and executed on the first content page.

IX. Terminology

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. A computing environment can include any type of computer system, including, but not limited to, a computer system based on a microprocessor, a mainframe computer, a digital signal processor, a portable computing device, a device controller, or a computational engine within an appliance, to name a few.

The steps of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments described herein can be embodied within a form that does not provide all of the features and benefits set forth herein, as some features can be used or practiced separately from others.

What is claimed:

1. A system for facilitating digital tag prefetching, the system comprising:
a computer system comprising physical computer hardware configured to:
request a first content page of a content site from a content site server, the content site comprising the first content page and a subsequent content page, the first content page comprising first page elements and an embedded reference to a first tag, the subsequent content page comprising second page elements, the first tag comprising first instructions for gathering first data indicative of user interactions with the content site;
load the first page elements in memory of the computer system to cause the first page elements to be rendered for output on a display to a user;
load the first tag in the memory;
execute the first tag with respect to the first content page to cause the first data indicative of user interactions with the first content page to be gathered and transmitted over a computer network to a remote processing system;
prior to loading the subsequent content page in the memory, prefetch a second tag related to the subsequent content page, the second tag comprising second instructions for gathering second data indicative of user interactions with the content site, wherein the computer system is configured to prefetch the second tag by at least:
requesting the second tag from a tag server over the network, and
caching the second tag in the memory for later execution with respect to the subsequent content page and not executing the second tag with respect to the first content page; and
in response to loading of the subsequent content page in place of the first content page, execute the second tag with respect to the subsequent content page to cause the second data indicative of user interactions with the subsequent content page to be gathered and transmitted over the computer network.

2. The system of claim 1, wherein the computer system is further configured to determine whether to prefetch the second tag by at least requesting from a remote server an indication of one or more tags to prefetch, the remote server being separate from the content site server.

3. The system of claim 1, wherein the computer system is further configured to cache the second tag in the memory for later execution with respect to a plurality of content pages of the content site, the plurality of content pages including the subsequent content page.

4. The system of claim 1, wherein the subsequent content page is linked to by the first content page via one or more links.

5. The system of claim 1, wherein the subsequent content page is associated with a user idle time that provides insufficient time for loading of the second tag if the second tag is loaded when the subsequent content page is loaded.

6. The system of claim 5, wherein the first content page is a checkout page, and the subsequent content page is a receipt page.

7. The system of claim 1, wherein the computer system is further configured to prefetch the second tag in response to determining that the second tag has not been previously cached in the memory.

8. The system of claim 1, wherein the computer system is further configured to:
- subsequent to prefetching the second tag, request the subsequent content page from the content site server over the computer network; and
- load the second page elements in the memory to cause the second page elements to be rendered for output on the display to the user.

9. The system of claim 1, wherein the computer system is further configured to:
- load the first page elements and the first tag prior to prefetching the second tag; and
- prefetch the second tag during idle time on the first content page.

10. The system of claim 1, wherein the computer system is further configured to load the embedded reference to the first tag to call the first tag.

11. The system of claim 1, wherein the computer system is further configured to execute the first tag with respect to the subsequent content page to cause the first data indicative of user interactions with the subsequent content page to be gathered and transmitted over the computer network to the remote processing system.

12. The system of claim 1, wherein the subsequent content page is linked to the first content page via an intermediary content page of the content site and not directly linked to the first content page.

13. The system of claim 1, wherein the subsequent content page comprises an embedded reference to the second tag.

14. The system of claim 13, wherein the embedded reference to the first tag comprises the first tag, and the embedded reference to the second tag comprises the second tag.

15. The system of claim 1, wherein the tag server is separate from the content site server.

16. A method of facilitating digital tag prefetching, the method comprising:
- under control of a physical computing device comprising digital logic circuitry:
  - requesting a first content page of a content site from a content site server, the content site comprising the first content page and a subsequent content page, the first content page comprising first page elements and an embedded reference to a first tag, the subsequent content page comprising second page elements, the first tag comprising first instructions for gathering first data indicative of user interactions with the content site;
  - loading the first page elements in memory of the physical computing device to cause the first page elements to be rendered for output on a display to a user;
  - loading the first tag in the memory;
  - executing the first tag with respect to the first content page to cause the first data indicative of user interactions with the first content page to be gathered and transmitted over a computer network to a remote processing system;
  - prior to loading the subsequent content page in the memory, prefetching a second tag related to the subsequent content page, the second tag comprising second instructions for gathering second data indicative of user interactions with the content site, wherein said prefetching comprises:
    - requesting the second tag from a tag server over the network, and
    - caching the second tag in the memory for later execution with respect to the subsequent content page and not executing the second tag with respect to the first content page; and
  - in response to loading of the subsequent content page in place of the first content page, executing the second tag with respect to the subsequent content page to cause the second data indicative of user interactions with the subsequent content page to be gathered and transmitted over the computer network.

17. The method of claim 16, further comprising determining whether to prefetch the second tag by at least requesting from a remote server an indication of one or more tags to prefetch, the remote server being separate from the content site server.

18. The method of claim 16, wherein the subsequent content page is associated with a user idle time that provides insufficient time for loading of the second tag if the second tag is loaded when the subsequent content page is loaded.

19. The method of claim 16, further comprising prefetching the second tag in response to determining that the second tag has not been previously cached in the memory.

20. The method of claim 16, further comprising:
- subsequent to said prefetching, requesting the subsequent content page from the content site server over the computer network; and
- loading the second page elements in the memory to cause the second page elements to be rendered for output on the display to the user.

21. The method of claim 16, further comprising:
- loading the first page elements and the first tag prior to said prefetching; and
- prefetching the second tag during idle time on the first content page.

22. The method of claim 16, wherein said loading the first tag further comprises loading the embedded reference to the first tag to call the first tag.

23. Non-transitory physical computer storage comprising computer-executable instructions stored thereon that, when executed by one or more processors, are configured to implement a process comprising:
- requesting a first content page of a content site from a content site server, the content site comprising the first content page and a subsequent content page, the first content page comprising first page elements and an embedded reference to a first tag, the subsequent content page comprising second page elements, the first tag comprising first instructions for gathering first data indicative of user interactions with the content site;
- loading the first page elements in memory to cause the first page elements to be rendered for output on a display to a user;
- loading the first tag in the memory;
- executing the first tag with respect to the first content page to cause the first data indicative of user interactions with the first content page to be gathered and transmitted over a computer network to a remote processing system;
- prior to loading the subsequent content page in the memory, prefetching a second tag related to the subsequent content page, the second tag comprising second instructions for gathering second data indicative of user interactions with the content site, wherein said prefetching comprises:
  - requesting the second tag from a tag server over the network, and caching the second tag in the memory for later execution with respect to the subsequent content page and not executing the second tag with respect to the first content page; and in response to loading of the subsequent content page in place of the first content page, executing the second tag with respect to the subsequent content page to cause the second data indicative of user interactions with the subsequent content page to be gathered and transmitted over the computer network.

24. The non-transitory physical computer storage of claim 23, wherein the subsequent content page is associated with a user idle time that provides insufficient time for loading of the second tag if the second tag is loaded when the subsequent content page is loaded.

25. The non-transitory physical computer storage of claim 23, wherein the process further comprises prefetching the second tag in response to determining that the second tag has not been previously cached in the memory.

* * * * *